United States Patent
Chun

(10) Patent No.: US 12,279,221 B2
(45) Date of Patent: Apr. 15, 2025

(54) MEASURE FOR CHANGING PLMN

(71) Applicant: LG ELECTRONICS INC., Seoul (KR)

(72) Inventor: Sungduck Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 522 days.

(21) Appl. No.: 17/629,717

(22) PCT Filed: Jul. 31, 2020

(86) PCT No.: PCT/KR2020/010140
§ 371 (c)(1),
(2) Date: Jan. 24, 2022

(87) PCT Pub. No.: WO2021/020933
PCT Pub. Date: Feb. 4, 2021

(65) Prior Publication Data
US 2022/0272651 A1 Aug. 25, 2022

(30) Foreign Application Priority Data
Aug. 1, 2019 (KR) .......................... 10-2019-0093889

(51) Int. Cl.
*H04W 60/04* (2009.01)
*H04W 48/18* (2009.01)
(Continued)

(52) U.S. Cl.
CPC .......... *H04W 60/04* (2013.01); *H04W 48/18* (2013.01); *H04W 60/06* (2013.01); *H04W 84/042* (2013.01)

(58) Field of Classification Search
CPC ..... H04W 60/04; H04W 48/18; H04W 60/06; H04W 84/042; H04W 4/40; H04W 48/12;
(Continued)

(56) References Cited

U.S. PATENT DOCUMENTS 8,417,243 B2 * 4/2013 Miklos .................. H04W 16/08
455/435.2
9,344,959 B2 * 5/2016 Klatt ...................... H04W 48/18
(Continued)

FOREIGN PATENT DOCUMENTS

KR 1020180101439 9/2018
WO 2017142362 8/2017
(Continued)

OTHER PUBLICATIONS

3GPP; TSG CT; Non-Access-Stratum (NAS) functions related to Mobile Station (MS) in idle mode (Release 16), 3GPP TS 23.122 V16.2.0, Jun. 14, 2019, see sections 4.4.3.4, 4.4.6 and 4.5.4, and appendix C.2.

*Primary Examiner* — Brian T O Connor
(74) *Attorney, Agent, or Firm* — BRYAN CAVE LEIGHTON PAISNER LLP

(57) ABSTRACT

One disclosure of the present specification provides a method for a terminal roaming in a second Public Land Mobile Network (PLMN) to change the connection to a first PLMN to which the terminal is subscribed. The method may include a step for the first PLMN to receive a first message including first information from a base station in the second PLMN. The method may include a step for inspecting whether a procedure for deregistering from the second PLMN is required. The method may include a step for performing the procedure for deregistering from the second PLMN on the basis of the inspection result. The method may include a step for selecting the first PLMN. The method may include a step for performing a procedure for registering to the first PLMN.

20 Claims, 19 Drawing Sheets

(51) Int. Cl.
*H04W 60/06* (2009.01)
*H04W 84/04* (2009.01)

(58) Field of Classification Search
CPC ....... H04W 88/06; H04W 4/90; H04W 48/10; H04W 48/14; H04W 8/12
See application file for complete search history.

(56) References Cited

U.S. PATENT DOCUMENTS

| | | | | |
|---|---|---|---|---|
| 9,713,080 | B1* | 7/2017 | Lee | H04W 48/18 |
| 10,764,952 | B2* | 9/2020 | Huang-Fu | H04W 4/90 |
| 10,779,254 | B2* | 9/2020 | Lee | H04L 47/821 |
| 10,986,602 | B2* | 4/2021 | Shan | H04W 12/06 |
| 11,632,734 | B2* | 4/2023 | Stojanovski | H04W 8/26 455/435.1 |
| 11,722,954 | B2* | 8/2023 | Basu Mallick | H04W 60/00 370/329 |
| 11,856,470 | B2* | 12/2023 | Qiao | H04W 24/04 |
| 11,943,732 | B2* | 3/2024 | Chun | H04W 8/02 |
| 11,979,939 | B2* | 5/2024 | Venkataraman | H04W 48/16 |
| 2013/0217391 | A1 | 8/2013 | Klatt et al. | |
| 2017/0006536 | A1* | 1/2017 | Baek | H04W 12/06 |
| 2019/0053139 | A1* | 2/2019 | Basu Mallick | H04W 88/02 |
| 2019/0059067 | A1 | 2/2019 | Lee et al. | |
| 2021/0029776 | A1* | 1/2021 | Tiwari | H04W 4/90 |
| 2021/0258869 | A1* | 8/2021 | Di Girolamo | H04W 48/16 |
| 2021/0314899 | A1* | 10/2021 | Shan | H04W 60/04 |
| 2024/0056932 | A1* | 2/2024 | Qiao | H04W 4/025 |

FOREIGN PATENT DOCUMENTS

| | | |
|---|---|---|
| WO | 2018097601 | 5/2018 |
| WO | 2018236164 | 12/2018 |

\* cited by examiner

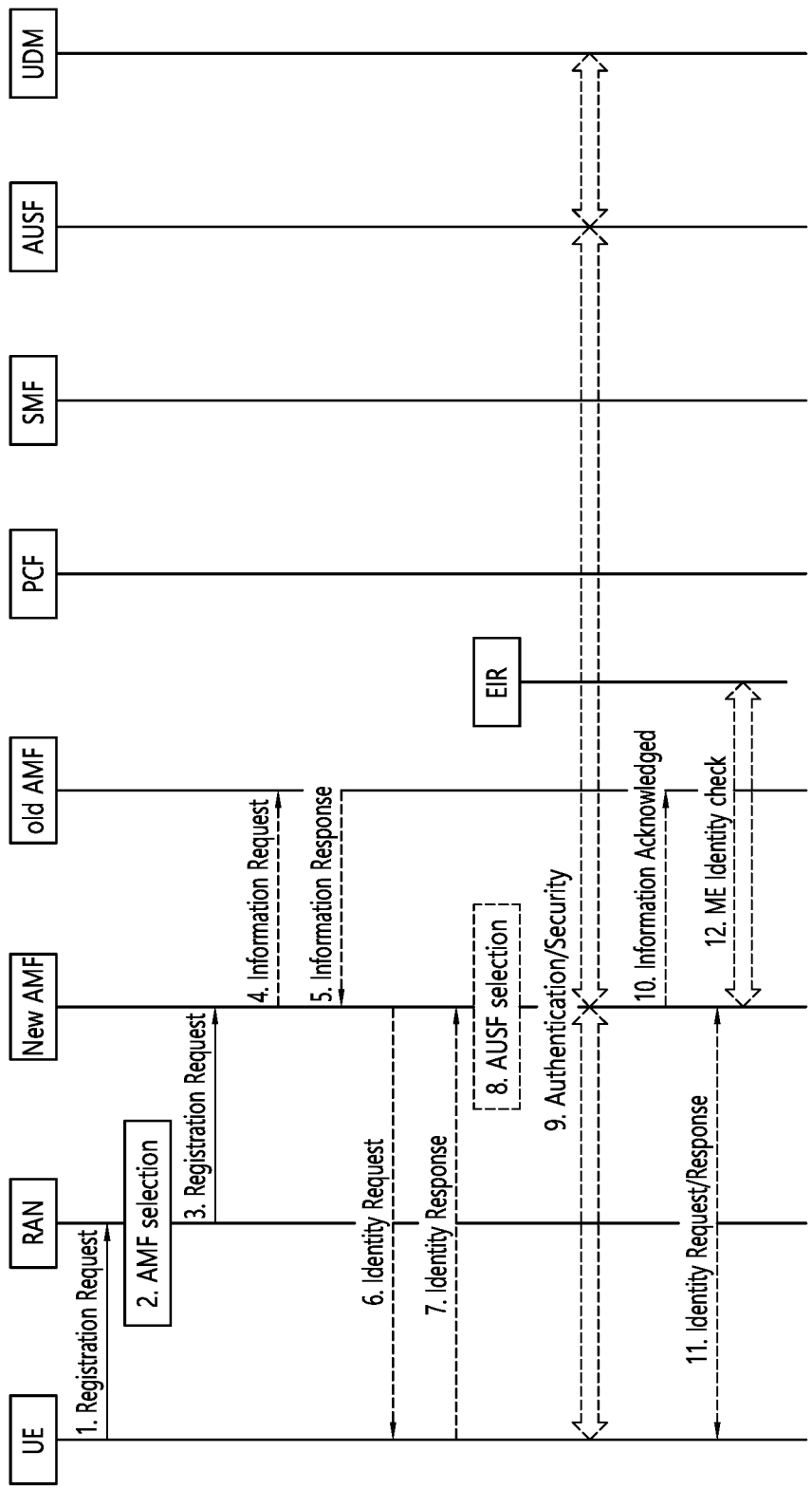

MEASURE FOR CHANGING PLMN

This application is the National Stage filing under 35 U.S.C. 371 of International Application No. PCT/KR2020/010140 filed on Jul. 31, 2020, which claims priority to Korean Patent Application No. 10-2019-0093889 filed on Aug. 1, 2019, the contents of which are all hereby incorporated by reference herein in their entirety.

TECHNICAL FIELD

The present specification relates to mobile communications.

BACKGROUND

3GPP (3rd Generation Partnership Project) SA (Service and System Aspects) SAE (System Architecture Evolution) centered on WG2 (working group 2) was conducted in parallel with LTE work of 3GPP TSG (Technical Specification Group) RAN (radio access network). This is a study on network technology that aims to determine the network structure and support mobility between heterogeneous networks, and is one of the important standardization issues of recent 3GPP. This is a task to develop the 3GPP system into a system that supports various wireless access technologies based on IP (internet protocol).

The Evolved Packet System (EPS) high-level reference model defined in 3GPP SA WG2 includes a non-roaming case and a roaming case of various scenarios. The network structure diagram of FIG. 1 is a simplified reconstruction of this.

FIG. 1 is a structural diagram of an evolved mobile communication network.

The Evolved Packet Core (EPC) may include various components, and in FIG. 1, some of them correspond to a Serving Gateway (S-GW) 52, a Packet Data Network Gateway (PDN GW) 53, MME (Mobility Management Entity) 51, SGSN (Serving General Packet Radio Service (GPRS) Supporting Node), ePDG (enhanced Packet Data Gateway) is shown.

The S-GW 52 is an element that functions as a boundary point between the radio access network (RAN) and the core network and maintains a data path between the eNodeB 22 and the PDN GW 53. In addition, when a terminal (or User Equipment: UE) moves over an area served by the eNodeB 22, the S-GW 52 serves as a local mobility anchor point. That is, packets may be routed through the S-GW 52 for mobility within the E-UTRAN (Evolved-UMTS (Universal Mobile Telecommunications System) Terrestrial Radio Access Network defined after 3GPP Release-8). In addition, the S-GW 52 is another 3GPP network (RAN defined before 3GPP Release-8, for example, UTRAN or GERAN (Global System for Mobile Communication) (GSM)/EDGE (Enhanced Data rates for Global Evolution) Radio Access Network) and may serve as an anchor point for mobility.

The PDN GW (or P-GW) 53 corresponds to the termination point of the data interface towards the packet data network. The PDN GW 53 may support policy enforcement features, packet filtering, charging support, and the like. In addition, for mobility management with a 3GPP network and a non-3GPP network (eg, an untrusted network such as an Interworking Wireless Local Area Network (I-WLAN), a trusted network such as a Code Division Multiple Access (CDMA) network) It can serve as an anchor point.

In the example of the network structure of FIG. 1, the S-GW 52 and the PDN GW 53 are configured as separate gateways, but the two gateways may be implemented according to a single gateway configuration option. have.

The MME 51 is an element that performs signaling and control functions to support access to a network connection of the UE, allocation of network resources, tracking, paging, roaming and handover, etc. The MME 51 controls control plane functions related to subscriber and session management. The MME 51 manages a number of eNodeBs 22 and performs signaling for selection of a conventional gateway for handover to another 2G/3G network. In addition, the MME 51 performs functions such as security procedures, terminal-to-network session handling, and idle terminal location management.

The SGSN handles all packet data such as user's mobility management and authentication to other connected 3GPP networks (eg, GPRS networks, UTRAN/GERAN).

The ePDG acts as a security node for untrusted non-3GPP networks (eg, I-WLAN, WiFi hotspots, etc.).

As described with reference to FIG. 1, the terminal (or UE) having IP capability provides 3GPP access as well as non-3GPP access based on various elements in the EPC via various elements provided by the operator (ie, operator). It can access an IP service network (eg, IMS).

In addition, FIG. 1 shows various reference points (eg, S1-U, S1-MME, etc.). In the 3GPP system, a conceptual link connecting two functions existing in different functional entities of E-UTRAN and EPC is defined as a reference point. Table 1 below summarizes the reference points shown in FIG. 1. In addition to the examples in Table 1, various reference points may exist according to the network structure.

TABLE 1

| Reference point | Explanation |
|---|---|
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in Idle and/or active state. This reference point can be used intra-PLMN or inter-PLMN (e.g. in the case of Inter-PLMN HO) |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity.) |

TABLE 1-continued

| Reference point | Explanation |
|---|---|
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point that provides the user plane with trusted non-3GPP access and related control and mobility support between PDN GWs. S2b is a reference point that provides related control and mobility support between ePDG and PDNGW to the user plane.

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

5G mobile communication supports multiple numerology or subcarrier spacing (SCS) to support various services. For example, when SCS is 15 kHz, it supports a wide area in traditional cellular bands, and when SCS is 30 kHz/60 kHz, dense-urban, lower latency and wider carrier bandwidth, and when SCS is 60 kHz or higher, a bandwidth greater than 24.25 GHz to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW).

For convenience of explanation, among the frequency ranges used in the NR system, FR1 may mean "sub 6 GHz range", FR2 may mean "above 6 GHz range", and may be referred to as millimeter wave (mmW).

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 3 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU proposes three usage scenarios, for example, eMBB (enhanced Mobile BroadBand), mMTC (massive Machine Type Communication) and URLLC (Ultra Reliable and Low Latency Communications). First of all, URLLC relates to usage scenarios that require high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of less than 1 ms.

Next, the eMBB usage scenario relates to a usage scenario requiring mobile ultra-wideband.

This ultra-wideband high-speed service seems difficult to be accommodated by the core network designed for the existing LTE/LTE-A.

Accordingly, in the so-called 5G mobile communication, redesign of the core network is urgently required.

FIG. 2 is a structural diagram of a next-generation mobile communication network.

5GC (5G Core) may include various components, and in FIG. 1, AMF (Access and Mobility Management Function) 410, SMF (Session Management Function) 420, and PCF (Policy Control) corresponding to some of them Function) 430, UPF (User Plane Function) 440, AF (Application Function) 450, UDM (Unified Data Management) 460, and N3IWF (Non-3GPP InterWorking Function) 490.

The UE 100 is connected to a data network through the UPF 440 through a Next Generation Radio Access Network (NG-RAN).

The UE 100 may receive a data service through untrusted non-3rd Generation Partnership Project (non-3GPP) access, for example, a wireless local area network (WLAN). To connect the non-3GPP access to the core network, an N3IWF 490 may be deployed.

FIG. 3 is an exemplary diagram illustrating an expected structure of next-generation mobile communication from the viewpoint of a node.

As can be seen with reference to FIG. 3, the UE is connected to a data network (DN) through a next-generation RAN (Radio Access Network).

The illustrated control plane function (CPF) node is all or part of the functions of the MME (Mobility Management Entity) of the 4th generation mobile communication, and the control plane functions of a Serving Gateway (S-GW) and a PDN Gateway (P-GW). carry out all or part of The CPF node includes an Access and Mobility Management Function (AMF) and a Session Management Function (SMF).

The illustrated User Plane Function (UPF) node is a type of gateway through which user data is transmitted and received. The UPF node may perform all or part of the user plane functions of the S-GW and P-GW of 4G mobile communication.

The illustrated PCF (Policy Control Function) is a node that controls the operator's policy.

The illustrated application function (Application Function: AF) is a server for providing various services to the UE.

The illustrated unified data management (UDM) is a kind of server that manages subscriber information, like a home subscriber server (HSS) of 4G mobile communication. The UDM stores and manages the subscriber information in a Unified Data Repository (UDR).

The illustrated Authentication Server Function (AUSF) authenticates and manages the UE.

The illustrated network slice selection function (NSSF) is a node for network slicing as will be described later.

In FIG. 2, a UE may simultaneously access two data networks using multiple PDU (protocol data unit or packet data unit) sessions.

FIG. 4 is an exemplary diagram illustrating an architecture for supporting simultaneous access to two data networks.

FIG. 4 shows an architecture for a UE to simultaneously access two data networks using one PDU session.

Reference points shown in FIGS. 3 and 4 are as follows.

N1 represents a reference point between the UE and the AMF.

N2 represents a reference point between (R)AN and AME

N3 represents the reference point between (R)AN and UPF.

N4 represents a reference point between SMF and UPF.

N5 represents the reference point between PCF and AF.

N6 represents a reference point between UPF and DN.

N7 represents a reference point between SMF and PCE

N8 represents a reference point between UDM and AMF.

N9 represents a reference point between UPFs.

N10 represents a reference point between the UDM and the SMF.

N11 represents a reference point between AMF and SMF.

N12 represents a reference point between AMF and AUSF.

N13 represents a reference point between UDM and AUSF.

N14 represents a reference point between AMFs.

N15 represents a reference point between PCF and AMF.

N16 represents a reference point between SMFs.

N22 represents a reference point between the AMF and the NSSF.

FIG. 5 is another exemplary diagram showing the structure of a radio interface protocol (Radio Interface Protocol) between the UE and the gNB.

The radio interface protocol is based on the 3GPP radio access network standard. The air interface protocol is horizontally composed of a physical layer, a data link layer, and a network layer, and vertically a user plane for data information transmission and control. It is divided into a control plane for signal transmission.

The protocol layers are L1 (first layer), L2 (second layer), and L3 (third layer) based on the lower three layers of the open system interconnection (OSI) reference model widely known in communication systems.) can be distinguished.

Hereinafter, each layer of the radio protocol will be described.

The first layer, the physical layer, provides an information transfer service using a physical channel The physical layer is connected to an upper medium access control layer through a transport channel, and data between the medium access control layer and the physical layer is transmitted through the transport channel And, data is transferred between different physical layers, that is, between the physical layers of the transmitting side and the receiving side through a physical channel.

The second layer includes a Medium Access Control (MAC) layer, a Radio Link Control (RLC) layer, and a Packet Data Convergence Protocol (PDCP) layer.

The third layer includes radio resource control (hereinafter abbreviated as RRC). The RRC layer is defined only in the control plane and is related to the establishment (establishment), re-establishment (Re-establishment) and release (Release) of radio bearers (Radio Bearer; abbreviated as RB) of logical channels, transport channels and physical channels. responsible for control In this case, the RB means a service provided by the second layer for data transfer between the UE and the E-UTRAN.

The NAS (Non-Access Stratum) layer performs functions such as connection management (session management) and mobility management (Mobility Management).

The NAS layer is divided into a NAS entity for MM (Mobility Management) and a NAS entity for SM (session management).

1) The NAS entity for MM provides the following general functions.

NAS procedures related to AMF, including the following.
Registration management and access management procedures. AMF supports the following functions.
Secure NAS signal connection between UE and AMF (integrity protection, encryption)

2) The NAS entity for SM performs session management between the UE and the SMF.

SM signaling messages are processed, ie, generated and processed in the NAS-SM layer of the UE and SMF. The content of the SM signaling message is not interpreted by the AME In case of SM signaling transmission, The NAS entity for MM creates a NAS-MM message that derives how and where to forward the SM signaling message with a security header indicating the NAS transmission of the SM signaling, additional information about the receiving NAS-MM.

Upon reception of SM signaling, the NAS entity for SM performs an integrity check of the NAS-MM message, and interprets additional information to derive a method and a place to derive the SM signaling message.

Meanwhile, in FIG. 4, the RRC layer, the RLC layer, the MAC layer, and the PHY layer located below the NAS layer are collectively referred to as an access layer (Access Stratum: AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

<Network Failure>

On the other hand, a failure may occur in the base station of the first public land mobile network (PLMN) by the first operator, so that a mobile communication service cannot be provided any longer through the corresponding base station.

A simple failure can be restored within a short period of time, but when a failure occurs due to fire, flooding, etc., it may not be restored for hours or days. In this case, simple communication may cause inconvenience to the user, but interruption of important communication (eg, emergency call (119 or 911 call) or corporate VPN communication) may cause a major problem.

Therefore, when a failure occurs in the first PLMN by the first operator, another second operator must provide a service for the subscribers of the first operator on behalf of the first operator.

If the failure of the first operator is restored during the service provision of the second operator, the first operator shall provide the service to its subscribers on behalf of the second operator. As such, it is necessary to change the operator from the viewpoint of the terminal, and a smooth change method is required when the terminal is using the application.

However, there is a problem that a technical method for this has not been proposed so far.

SUMMARY

Therefore, the disclosure of the present specification is to propose method for solving the above-mentioned problems.

In order to solve the above-mentioned problems, one disclosure of the present specification provides a method for a user equipment (UE) roaming in a second PLMN (Public Land Mobile Network) to change access to a first PLMN which the UE has subscribed, comprising:
  receiving a first message including first information from a base station of the second PLMN;
  checking whether a deregistration procedure with the second PLMN is necessary;
  performing the deregistration procedure with the second PLMN, based on result of the checking;
  selecting the first PLMN; and
  performing a registration procedure with the first PLMN.

The deregistration procedure may comprise transmitting a deregistration request message to an Access and Mobility Management Function (AMF) of the second PLMN through the base station of the second PLMN.

The deregistration procedure may comprise receiving a deregistration accept message from the AMF of the second PLMN through the base station of the second PLMN.

The first information may include information to cancel the connection with the second PLMN and to access the first PLMN and to perform a registration procedure with the first PLMN.

The first information may include information that disaster situation of the first PLMN is over.

The deregistration procedure may comprise: transmitting a deregistration request message to an Access and Mobility Management Function (AMF) of the second PLMN through the base station of the second PLMN.

The registration procedure may comprise transmitting a registration request message to AMF of the first PLMN through a base station of the first PLMN;

The registration procedure may comprise receiving a registration accept message from the AMF of the first PLMN through the base station of the first PLMN.

The first message may include information on end time of service by the second PLMN, the UE may not request service to the second PLMN, after the end time elapse.

The first message may be received through SIB (System Information Block).

The method may comprise receiving request message to maintain connection to specific application server, before the deregistration procedure.

The method may comprise transmitting resumption request message to the specific application server, after the registration procedure.

According to the disclosure of the present specification, it is possible to solve the problems of the prior art.

BRIEF DESCRIPTION OF THE DRAWINGS

FIG. 6a and FIG. 6b are signal flow diagrams illustrating an exemplary registration procedure.

DETAILED DESCRIPTION

Figure 1:
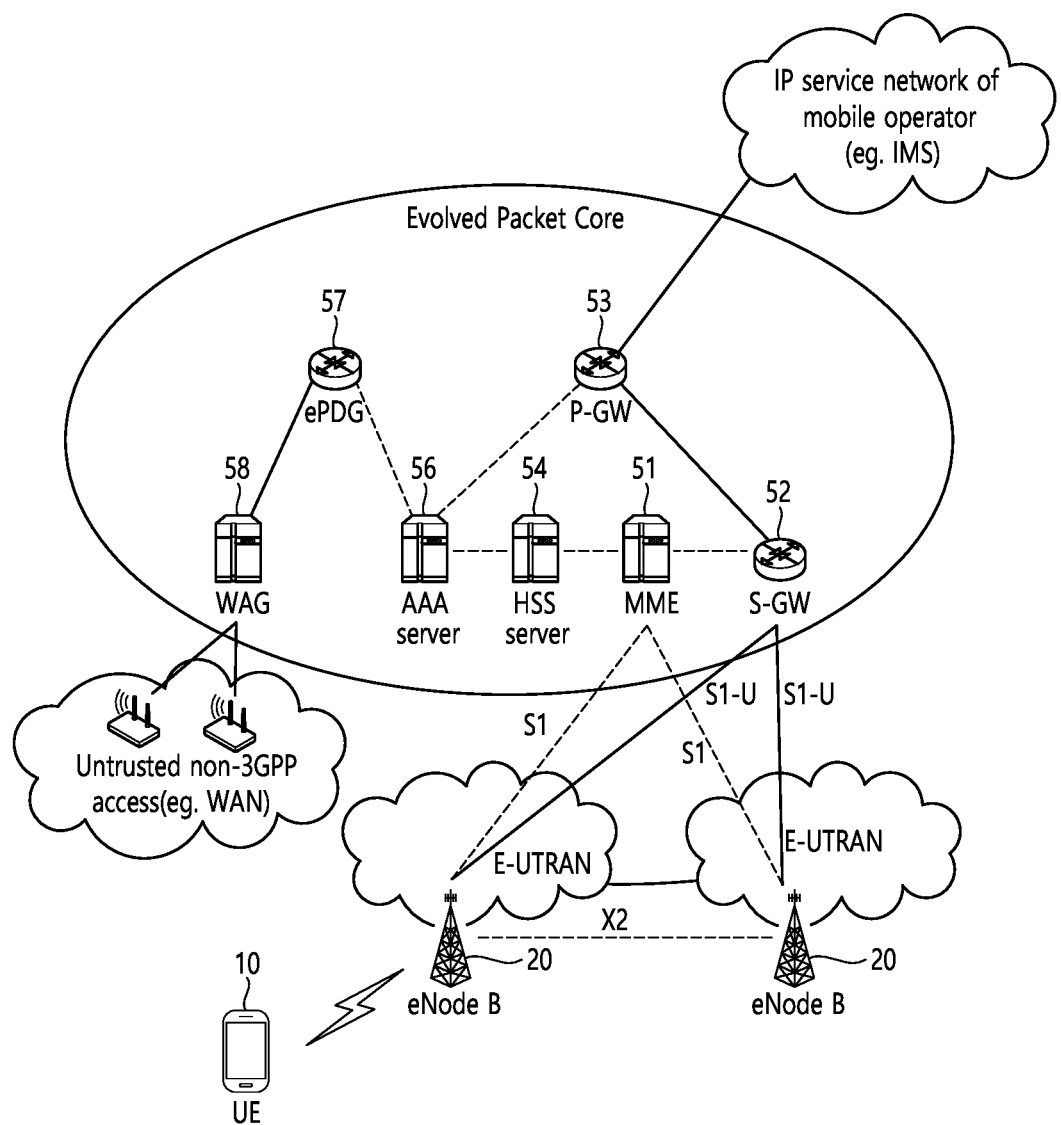
FIG. 1 is a structural diagram of an evolved mobile communication network.

The technical terms used herein are used to merely describe specific embodiments and should not be construed as limiting the technical idea. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are individually described in one drawing in this specification may be implemented individually or simultaneously.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

<Registration Procedure>

The UE needs to obtain an authorization to enable mobility tracking, to enable data reception, and to receive services. For this, the UE must register with the network. The registration procedure is performed when the UE needs to do initial registration with the 5G system. In addition, the registration procedure is performed when the UE performs periodic registration update, when moving from an idle mode to a new tracking area (TA), and when the UE needs to perform periodic registration update.

During the initial registration procedure, the ID of the UE may be obtained from the UE. AMF can pass PEI (IMEISV) to UDM, SMF and PCF.

Figure 6B:
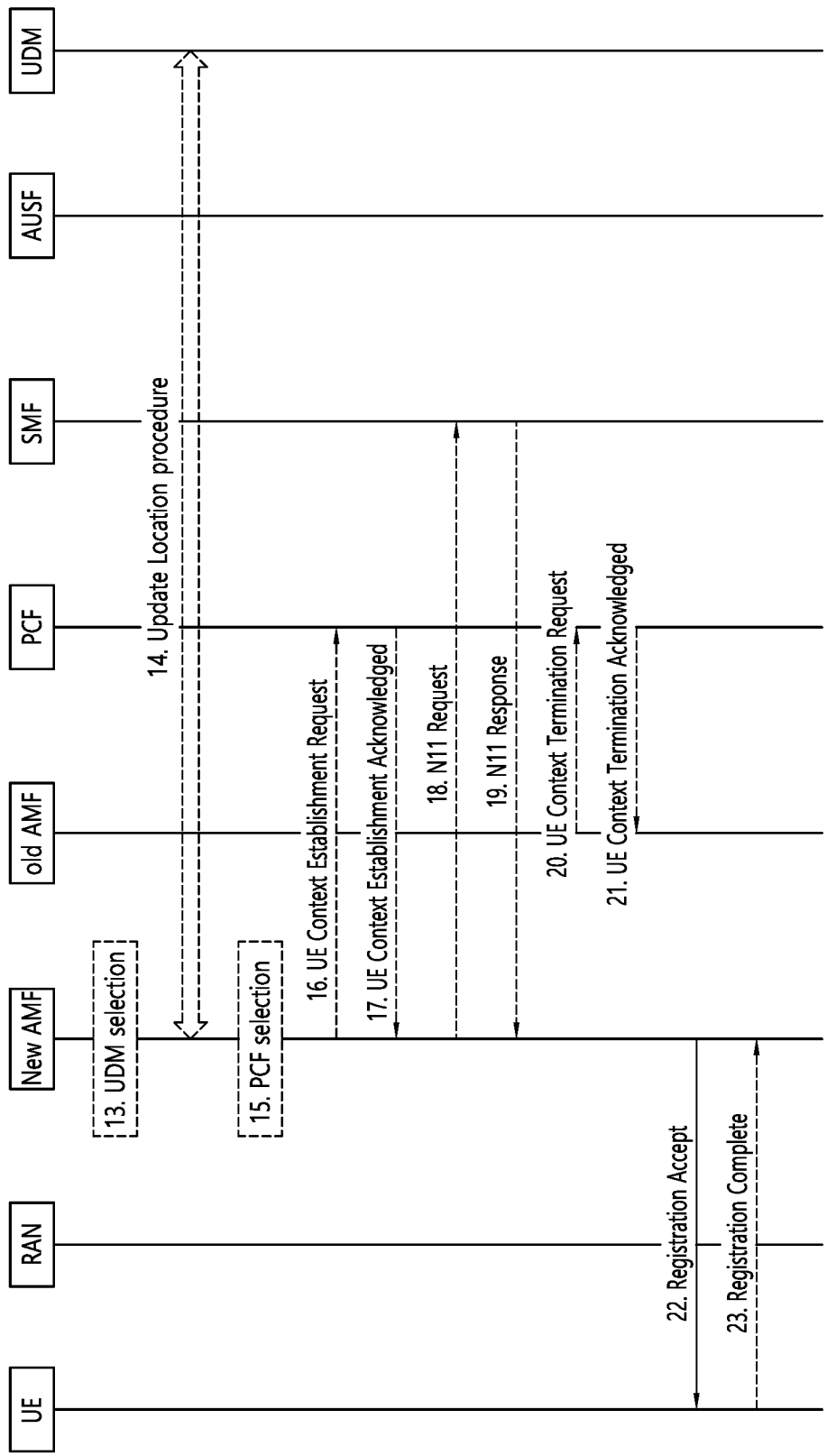

FIG. 6a and FIG. 6b are signal flow diagrams illustrating an exemplary registration procedure.

1) The UE may send an AN message to the RAN. The AN message may include an AN parameter and a registration request message. The registration request message may include information such as registration type, subscriber permanent ID or temporary user ID, security parameters, network slice selection assistance information (NSSAI), 5G capability of the UE, protocol data unit (PDU) session state, and the like.

In the case of 5G RAN, the AN parameters may include a Subscription Permanent Identifier (SUPI) or a temporary user ID, a selected network, and an NSSAI.

The registration type is "initial registration" (i.e. the UE is in a non-registered state), "Mobility registration update" (i.e. the UE is in a registered state and initiates the registration procedure due to mobility) or "Regular registration update" (That is, the UE is in the registered state and starts the registration procedure due to the expiration of the periodic update timer). When the temporary user ID is included, the temporary user ID indicates the last serving AMF. If the UE is already registered via non-3GPP access in a PLMN different from the Public Land Mobile Network (PLMN) of 3GPP access, the UE may not provide the temporary ID of the UE assigned by the AMF during the registration procedure via non-3GPP access.

Security parameters can be used for authentication and integrity protection.

The PDU session state may indicate a (previously established) PDU session usable in the UE.

2) If SUPI is included or the temporary user ID does not indicate a valid AMF, the RAN may select an AMF based on (R)AT and NSSAI.

If the (R)AN cannot select an appropriate AMF, it selects an arbitrary AMF according to a local policy, and transmits a registration request to the selected AMF. If the selected AMF cannot service the UE, the selected AMF selects another more suitable AMF for the UE.

3) The RAN transmits an N2 message to the new AMF. The N2 message includes an N2 parameter and a registration request. The registration request may include registration type, subscriber permanent identifier or temporary user ID, security parameters, NSSAI and MICO mode default settings, and the like.

When 5G-RAN is used, the N2 parameter includes location information related to the cell in which the UE is camping, a cell identifier, and a RAT type.

If the registration type indicated by the UE is periodic registration update, steps 4 to 17 to be described later may not be performed.

4) The newly selected AMF may transmit an information request message to the previous AMF.

If the temporary user ID of the UE is included in the registration request message and the serving AMF has changed since the last registration, the new AMF may send an information request message containing the complete registration request information to the old AMF to request the SUPI and MM context of the UE.

5) The previous AMF transmits an information response message to the newly selected AMF. The information response message may include SUPI, MM context, and SMF information.

Specifically, the previous AMF sends an information response message including the UE's SUPI and MM context.

If the previous AMF has information on the active PDU session, the previous AMF may include SMF information including the ID of the SMF and the PDU session ID in the information response message.

6) The new AMF sends an Identity Request message to the UE if the SUPI is not provided by the UE or retrieved from the previous AMF.

7) The UE transmits an Identity Response message including the SUPI to the new AMF.

8) AMF may decide to trigger AUSF. In this case, the AMF may select the AUSF based on the SUPI.

9) AUSF may initiate authentication of UE and NAS security functions.

10) The new AMF may transmit an information response message to the previous AMF.

If the AMF is changed, the new AMF may transmit the information response message to confirm delivery of the UE MM context.

If the authentication/security procedure fails, registration is rejected and the new AMF can send a rejection message to the old AMF.

11) The new AMF may transmit an Identity Request message to the UE.

If the PEI was not provided by the UE or was not retrieved from the previous AMF, an Identity Request message may be sent for the AMF to retrieve the PEI.

12) The new AMF checks the ME identifier.

13) If step 14 to be described later is performed, the new AMF selects a UDM based on SUPI.

14) If the AMF is changed after the last registration, there is no valid subscription context for the UE in the AMF, or the UE provides a SUPI that does not refer to a valid context in the AMF, the new AMF starts the Update Location procedure. Alternatively, it may be started even when the UDM starts the location cancellation (Cancel Location) for the previous AMF. The old AMF discards the MM context and notifies all possible SMF(s), and the new AMF creates the MM context for the UE after obtaining the AMF related subscription data from the UDM.

When network slicing is used, the AMF obtains the allowed NSSAI based on the requested NSSAI, UE subscription and local policy. Reroute registration requests if AMF is not eligible to support allowed NSSAI.

15) The new AMF may select a PCF based on SUPI.

16) The new AMF transmits a UE Context Establishment Request message to the PCF. The AMF may request an operator policy for the UE from the PCF.

17) The PCF transmits a UE Context Establishment Acknowledged message to the new AMF.

18) The new AMF transmits an N11 request message to the SMF

Specifically, when the AMF is changed, the new AMF notifies each SMF of the new AMF serving the UE. The AMF verifies the PDU session state from the UE with the available SMF information. When the AMF is changed, available SMF information may be received from the previous AMF. The new AMF may request the SMF to release the network resources related to the PDU session not active in the UE.

19) The new AMF transmits an N11 response message to the SMF.

20) The previous AMF transmits a UE Context Termination Request message to the PCF.

If the previous AMF has previously requested that the UE context be established in the PCF, the old AMF may delete the UE context from the PCF.

21) The PCF may transmit a UE Context Termination Request message to the previous AMF.

22) The new AMF transmits a registration accept message to the UE. The registration acceptance message may include temporary user ID, registration area, mobility restriction, PDU session status, NSSAI, regular registration update timer, and allowed MICO mode.

The registration accept message may include information of the allowed NSSAI and the mapped NSSAI. The allowed NSSAI information for the access type of the UE may be included in the N2 message including the registration accept message. The mapped NSSAI information is information that maps each S-NSSAI of the allowed NSSAI to the S-NASSI of the NSSAI configured for HPLMN.

When the AMF allocates a new temporary user ID, the temporary user ID may be further included in the registration acceptance message. When the mobility restriction is applied to the UE, information indicating the mobility restriction may be additionally included in the registration accept message. The AMF may include information indicating the PDU session state for the UE in the registration accept message. The UE may remove any internal resources associated with a PDU session not marked as active in the received PDU session state. If the PDU session state information is in the Registration Request message, the AMF may include information indicating the PDU session state to the UE in the registration accept message.

23) The UE transmits a registration complete message to the new AMF.

<PDU Session Establishment Procedure>

In the protocol data unit (PDU) session establishment procedure, two types of PDU session establishment procedures may exist as follows.

PDU session establishment procedure initiated by the UE

PDU session establishment procedure initiated by the network. To this end, the network may send a device trigger message to the application(s) of the UE.

Figure 7A:
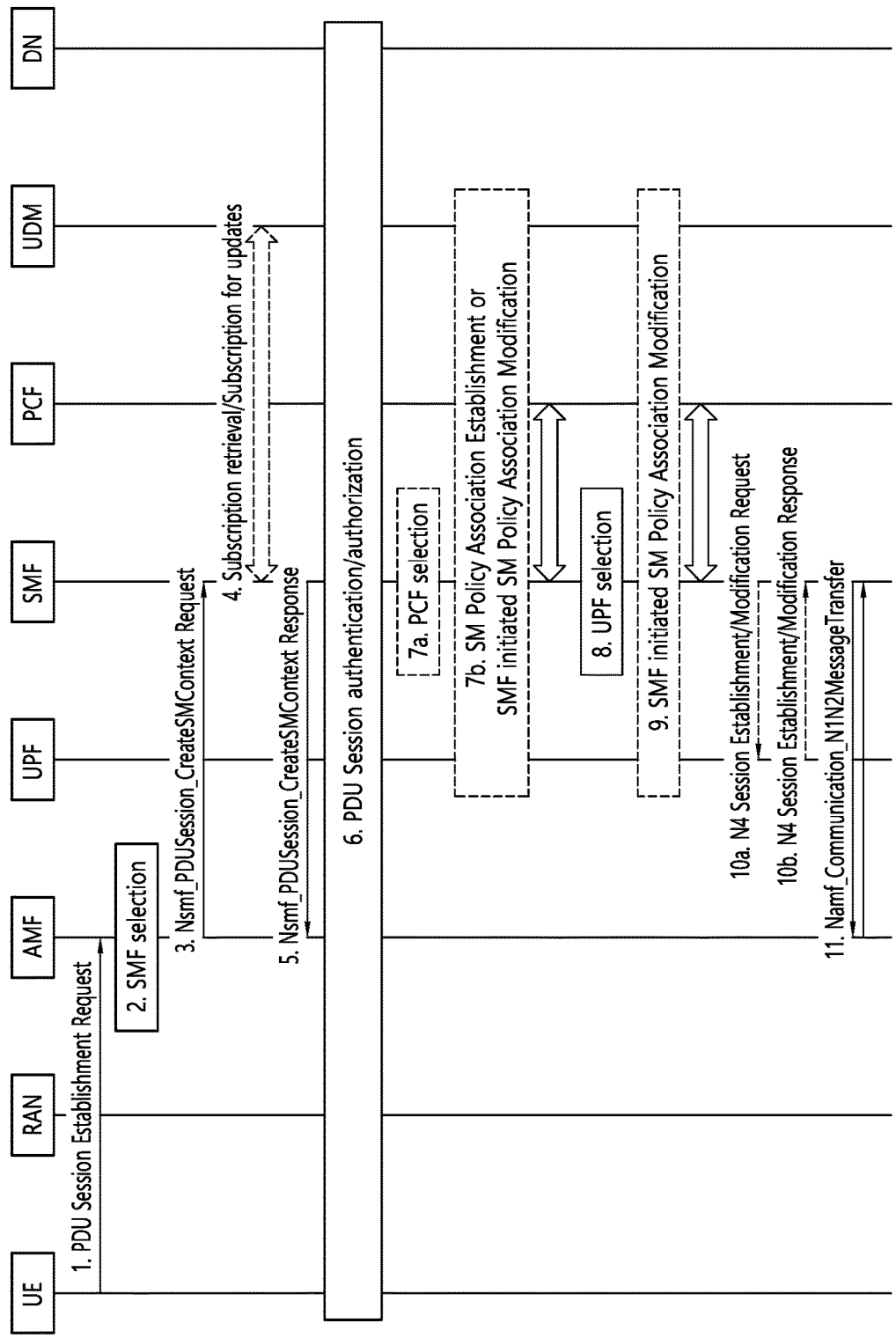
FIG. 7a and FIG. 7b are signal flow diagrams illustrating an exemplary PDU session establishment procedure.
Figure 7B:
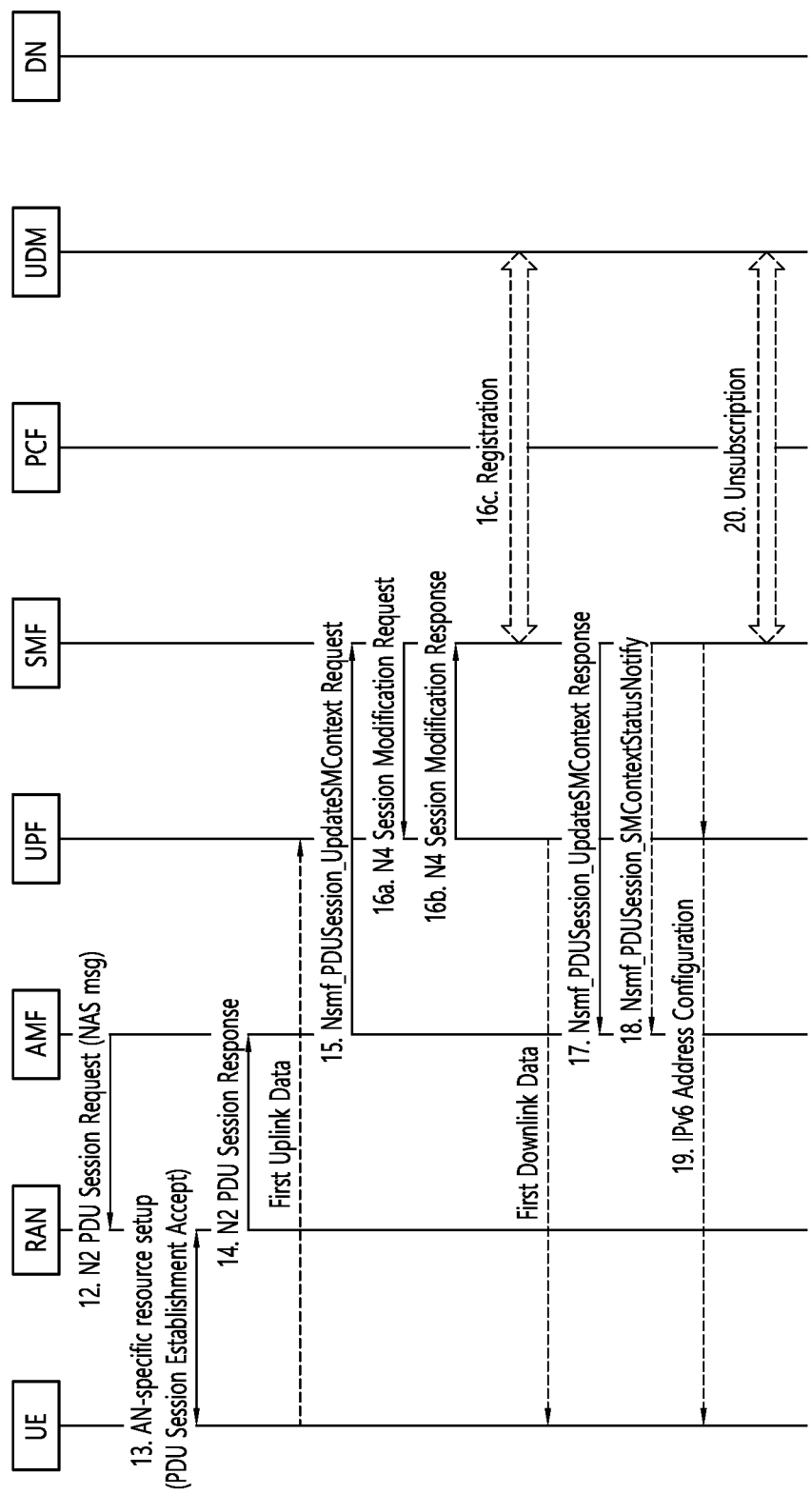

FIG. 7a and FIG. 7b are signal flow diagrams illustrating an exemplary PDU session establishment procedure.

The procedure shown in FIGS. 7A and 7B assumes that the UE has already registered with the AMF according to the registration procedure shown in FIG. 6. Therefore, it is assumed that the AMF has already obtained the user subscription data from the UDM.

1) The UE sends a NAS message to the AMF. The message may include Session Network Slice Selection Assistance Information (S-NSSAI), DNN, PDU session ID, request type, N1 SM information, and the like.

Specifically, the UE includes the S-NSSAI from the allowed NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information in which each S-NSSAI of the allowed NSSAI is mapped to an S-NASSI of an NSSAI configured for HPLMN.

More specifically, the UE extracts and stores the information of the allowed S-NSSAI and the mapped S-NSSAI included in the registration accept message received from the network (ie, AMF) in the registration procedure of FIG. have. Accordingly, the UE may transmit the PDU session establishment request message by including both the S-NSSAI based on the allowed NSSAI and the corresponding S-NSSAI based on the mapped NSSAI information.

To establish a new PDU session, the UE may generate a new PDU session ID.

The UE may start the PDU session establishment procedure initiated by the UE by sending a NAS message including the PDU session establishment request message in the N1 SM information. The PDU session establishment request message may include a request type, an SSC mode, and a protocol configuration option.

When the PDU session establishment is for establishing a new PDU session, the request type indicates "initial request". However, when there is an existing PDU session between 3GPP access and non-3GPP access, the request type may indicate "existing PDU session".

The NAS message transmitted by the UE is encapsulated in the N2 message by the AN.

The N2 message is transmitted to the AMF and may include user location information and access technology type information.

N1 SM information may include an SM PDU DN request container including information on PDU session authentication by external DN.

2) The AMF may determine that the message corresponds to a request for a new PDU session when the message indicates that the request type is "initial request" and the PDU session ID is not used for the existing PDU session of the UE.

If the NAS message does not include the S-NSSAI, the AMF may determine the default S-NSSAI for the requested PDU session according to the UE subscription. The AMF may store the PDU session ID and the SMF ID in association.

The AMF may select SMF.

3) The AMF may transmit an Nsmf_PDUSession_CreateSMContext Request message or an Nsmf_PDUSession_UpdateSMContext Request message to the selected SMF.

The Nsmf_PDUSession_CreateSMContext Request message is SUPI, DNN, S-NSSAI(s), PDU Session ID, AMF ID, Request Type, PCF ID, Priority Access, N1 SM container, User location information, Access Type, PEI, GPSI, UE presence in It may include LADN service area, Subscription For PDU Session Status Notification, DNN Selection Mode, and Trace Requirements. The SM container may include a PDU Session Establishment Request message.

The Nsmf_PDUSession_UpdateSMContext Request message may include SUPI, DNN, S-NSSAI(s), SM Context ID, AMF ID, Request Type, N1 SM container, User location information, Access Type, RAT type, and PEI. The N1 SM container may include a PDU Session Establishment Request message.

The AMF ID is used to identify the AMF serving the UE. The N1 SM information may include a PDU session establishment request message received from the UE.

4) SMF transmits subscriber data request message to UDM. The subscriber data request message may include a permanent subscriber ID and DNN. UDM may send subscription data response message to SMF If the request type indicates "existing PDU session" in step 3 above, the SMF determines that the request is due to handover between 3GPP access and non-3GPP access. The SMF may identify an existing PDU session based on the PDU session ID.

If the SMF has not yet retrieved the SM related subscription data for the UE related to the DNN, the SMF may request the subscription data.

The subscription data may include information about an authenticated request type, an authenticated SSC mode, and a basic QoS profile.

The SMF may check whether the UE request complies with user subscription and local policies. Alternatively, the SMF rejects the UE request through NAS SM signaling (including the relevant SM rejection cause) delivered by the AMF, and the SMF informs the AMF that the PDU session ID should be considered as released.

5) SMF transmits Nsmf_PDUSession_CreateSMContext Response message or Nsmf_PDUSession_UpdateSMContext Response message to AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext Request message and the SMF can process the PDU Session establishment request message, the SMF SM context is created and the SM context ID is delivered to the AMF.

6) Secondary authentication/authorization is optionally performed.

7a) If the working PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF can also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise may start the N4 session modification procedure using the selected UPF.

10a) SMF sends N4 session establishment/modification request message to UPF. In addition, the SMF may provide packet detection, enforcement and reporting rules to be installed in the UPF for the PDU session. When the SMF is allocated CN tunnel information, the CN tunnel information may be provided to the UPF.

10b) The UPF may respond by sending an N4 session establishment/modification response message. When the CN tunnel information is allocated by the UPF, the CN tunnel information may be provided to the SMF.

11) The SMF transmits the Namf_Communication_N1N2MessageTransfer message to the AMF. The Namf_Communication_N1N2MessageTransfer message may include a PDU Session ID, N2 SM information, and N1 SM container.

The N2 SM information is PDU Session ID, QoS Flow ID (QFI), QoS Profile(s), CN Tunnel Info, S-NSSAI from the Allowed NSSAI, Session-AMBR, PDU Session Type, User Plane Security Enforcement information, UE Integrity Protection Maximum Data Rate may be included.

The N1 SM container may include a PDU session establishment acceptance message.

The PDU session establishment acceptance message may include an allowed QoS rule, SSC mode, S-NSSAI, and an assigned IPv4 address.

12) AMF transmits an N2 PDU session request message to the RAN. The message may include N2 SM information and a NAS message. The NAS message may include a PDU session ID and a PDU session establishment acceptance message.

The AMF may transmit a NAS message including a PDU session ID and a PDU session establishment accept message. In addition, the AMF transmits the received N2 SM information from the SMF to the RAN by including it in the N2 PDU session request message.

13) The RAN may do a specific signaling exchange with the UE related to the information received from the SMF.

The RAN also allocates RAN N3 tunnel information for the PDU session.

The RAN delivers the NAS message provided in step 10 to the UE. The NAS message may include a PDU session ID and N1 SM information. The N1 SM information may include a PDU session establishment acceptance message.

The RAN sends the NAS message to the UE only when the necessary RAN resources are established and the allocation of the RAN tunnel information is successful.

14) The RAN transmits an N2 PDU session response message to the AMF. The message may include a PDU session ID, cause, and N2 SM information. The N2 SM information may include a PDU session ID, (AN) tunnel information, and a list of allowed/rejected QoS profiles.

RAN tunnel information may correspond to the access network address of the N3 tunnel corresponding to the PDU session.

15) AMF may transmit Nsmf_PDUSession_UpdateSMContext Request message to SMF. The Nsmf_PDUSession_UpdateSMContext Request message may include N2 SM information. Here, the AMF may be to transfer the N2 SM information received from the RAN to the SMF.

16a) If the N4 session for the PDU session is not already established, the SMF may start the N4 session establishment procedure together with the UPF. If not, the SMF can use the UPF to initiate the N4 session modification procedure. The SMF may provide AN tunnel information and CN tunnel information. The CN tunnel information may be provided only when the SMF selects the CN tunnel information in step 8.

16b) The UPF may transmit an N4 session modification response message to the SMF.

17) The SMF transmits an Nsmf_PDUSession_UpdateSMContext Response message to the AMF.

After this process, the AMF can deliver the related event to the SMF.

18) The SMF transmits an Nsmf_PDUSession_SMContextStatusNotify message.

19) SMF transmits information to UE through UPF. Specifically, in the case of PDU Type IPv6, the SMF may generate an IPv6 Router Advertisement and transmit it to the UE through N4 and UPF.

20) If PDU session establishment is not successful during the procedure, the SMF notifies the AMF.

Figure 8A:
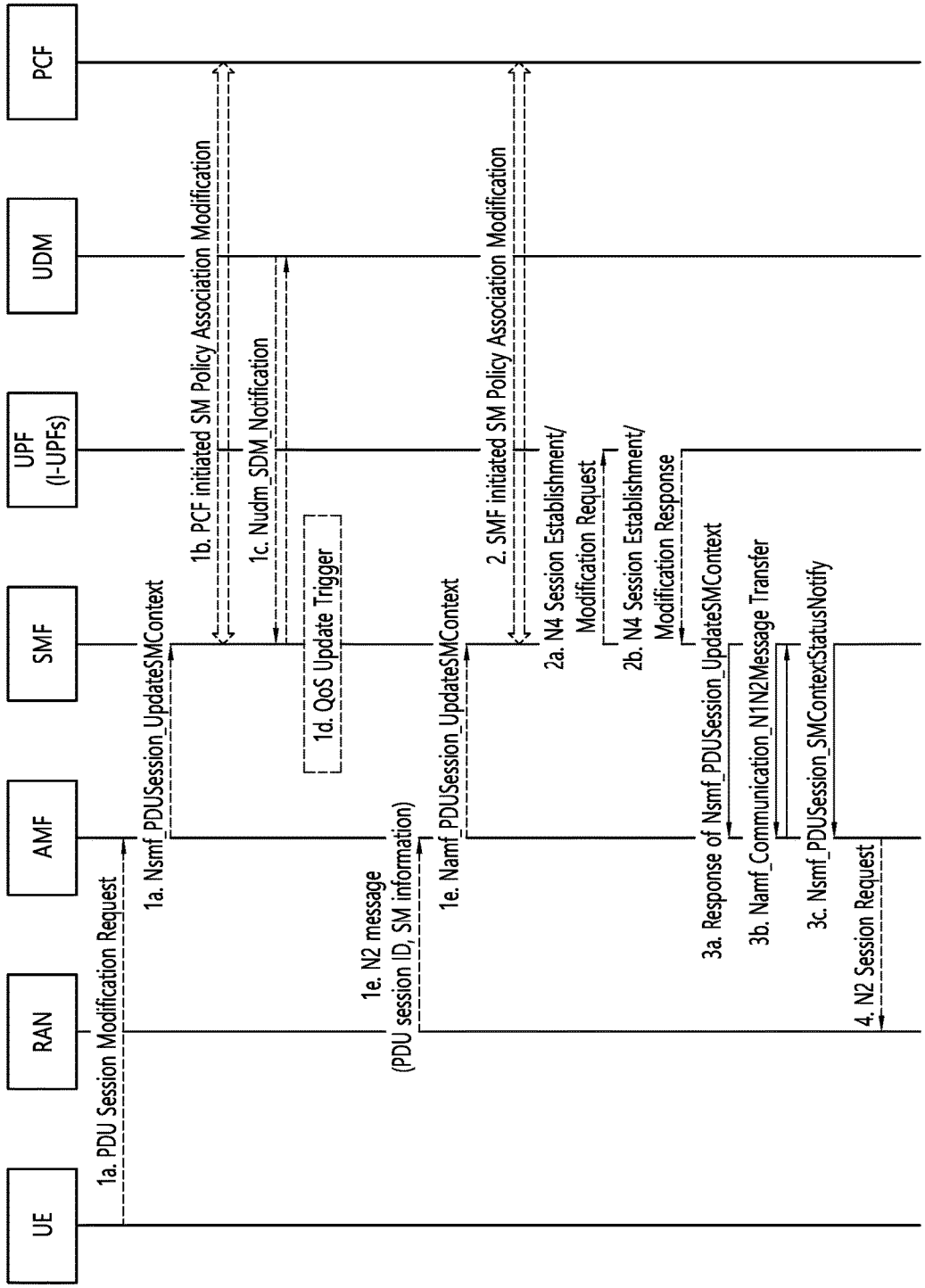
FIG. 8a and FIG. 8b show a procedure for modifying a PDU session.
Figure 8B:
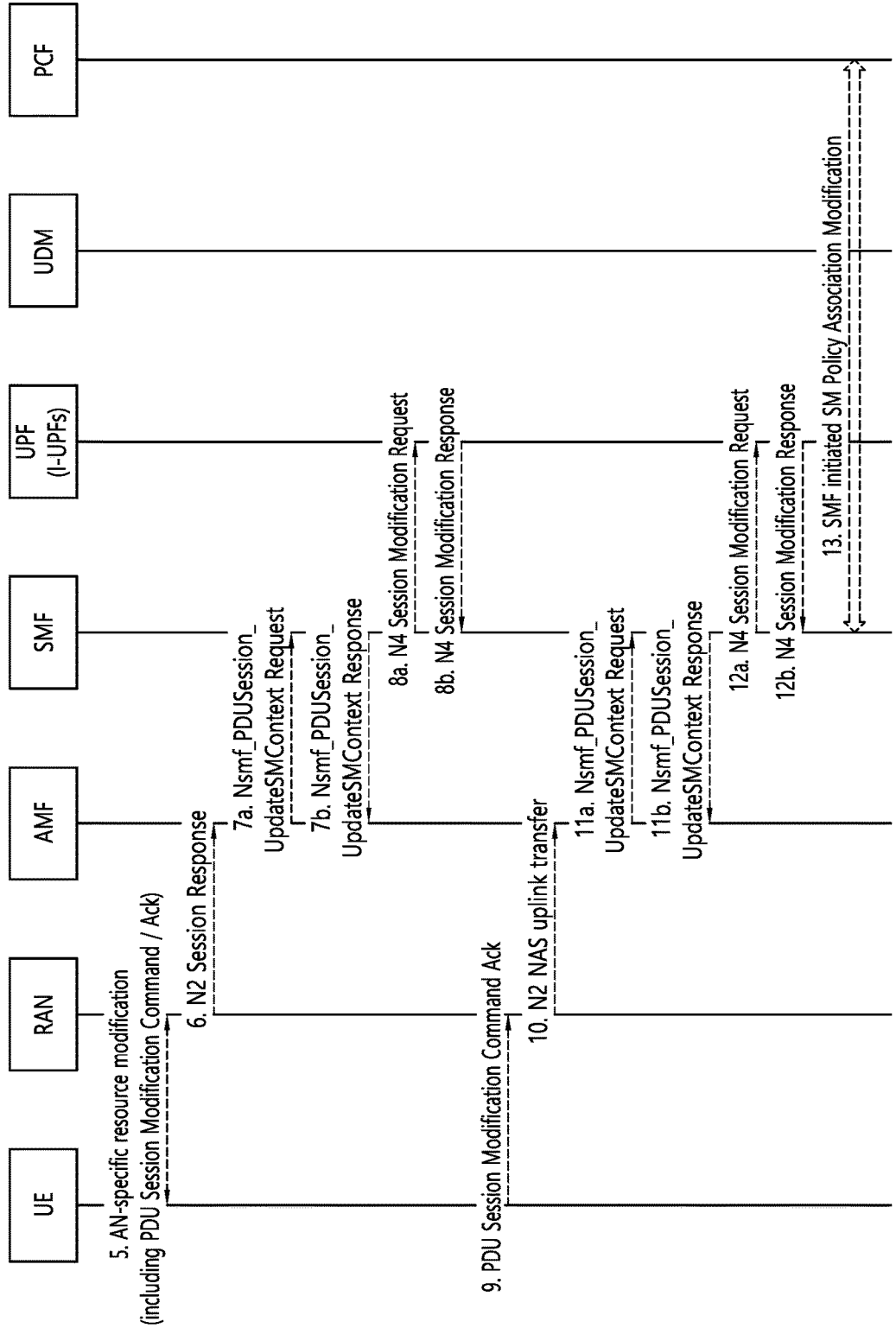

FIG. 8a and FIG. 8b show a procedure for modifying a PDU session.

The MA PDU session may be established/managed based on the PDU session modification procedure.

The PDU session modification procedure may be initiated by the UE or may be initiated by the network.

1a) When the UE initiates, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, information on requested QoS, 5GSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is delivered to an appropriate AMF according to the location information of the UE via the RAN. Then, the AMF transmits an Nsmf_PDUSession_UpdateSMContext message to the SMF. The message may include a session management (SM) context ID and an N1 SM container. The N1 SM container may include a PDU session modification request message.

1b) When initiated by the PCF among the network nodes, the PCF may inform the SMF of the policy change by initiating the SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) If initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include a QoS Flow ID (QFI), user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy alliance modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7 described later may not be performed when the PDU session modification requires only the UPF operation.

3a) When initiated by the UE or the AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command. The PDU session modification command may include a PDU session ID, a QoS rule, a QuS rule operation, a QoS parameter per QoS flow, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command The PDU session modification command may include a PDU session ID, QoS rules, and QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters a reachable state, that is, the UE enters the CM-CONNECTED state, the AMF may transmit an N1 message to synchronize the UE and the UE context.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, in order to modify the necessary AN resources related to the PDU session, an RRC connection reconfiguration procedure with the UE may be performed.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and PDU session IDs.

7) The AMF delivers the N2 SM information and user location information received from the AN to the SMF through the Nsmf_PDUSession_UpdateSMContext message. Then, the SMF transmits the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command. The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy alliance modification procedure.

The SMF may notify the requesting entity for user location information related to the change of the PDU session.

<Problems to be Solved by the Disclosure of this Specification>

In the present specification, a situation in which a failure occurs in the base station of the first PLMN by the first operator and network no longer provides a mobile communication service through the corresponding base station is described. Temporarily (eg, hours or days, etc.) until the physical recovery of the corresponding base station is achieved. In order for the base station of the second PLMN by the second operator to provide a service on behalf of the first operator in the affected area, the SIB (system information block) message may be broadcast by including information on the first PLMN by a third party (ie, the first operator).

That is, when the service cannot be provided due to a disaster (natural disaster such as fire or earthquake) occurring in the network of the telecommunication service provider to which the terminal is subscribed, the terminal accesses the network of another telecommunication service provider and receives the communication service. As described above, in a normal situation, the terminal cannot receive a service from the networks of other nearby carriers, but in a special environment such as a disaster situation, it is to receive a communication service. This is called a disaster communication service. Here, the disaster communication service does not mean the delivery of disaster-related information or communication related to emergency agencies, etc., but means that the service that the user normally receives is provided through a carrier other than the carrier that he or she originally subscribed to due to a disaster.

In this way, when a disaster (natural disaster such as fire or earthquake) occurs in the network of the mobile operator to which the terminal is subscribed, the terminal can access the network of another operator and use the telephone sending/receiving service, text message service, Internet browsing service, etc. do. In the process of the terminal accessing the communication network (hereinafter referred to as communication network B) of another communication service provider and receiving the service, the terminal registers with other services, for example, instant messaging service, using the IP allocated from the communication network B; Or, it registers with the IMS service and prepares to transmit/receive a phone call.

In this process, if the recovery of the disaster situation of the communication network (hereinafter referred to as communication network A) of the operator to which the terminal is subscribed is completed, the terminal should terminate the connection in the communication network B and access the communication network A. That is, the communication network A receives a service fee from the user and provides the service to the terminal, but if the user receives the service from the communication company B in a situation such as a disaster, the communication company A must pay the usage fee to the communication company B. Accordingly, the network A wants to move its subscribers from the communication network B to its own network A as soon as the communication network is restored.

However, if the terminal suddenly changes the communication network while there is an application currently in progress, the IP of the terminal is changed in this process, which causes the application to abruptly terminate, which is a problem. The disclosure of the present specification solves this problem.

<Disclosure of the Present Specification>

The disclosure of the present specification may be implemented by a combination of one or more of the following configurations. In the case of the embodiment below, an embodiment is shown to show each individual configuration, but an embodiment in which one or more combinations are configured together may be implemented.

Hereinafter, an EPS-based embodiment will be described, but the content disclosed by this specification is also applicable to an embodiment implemented in 5GS.

Figure 9:
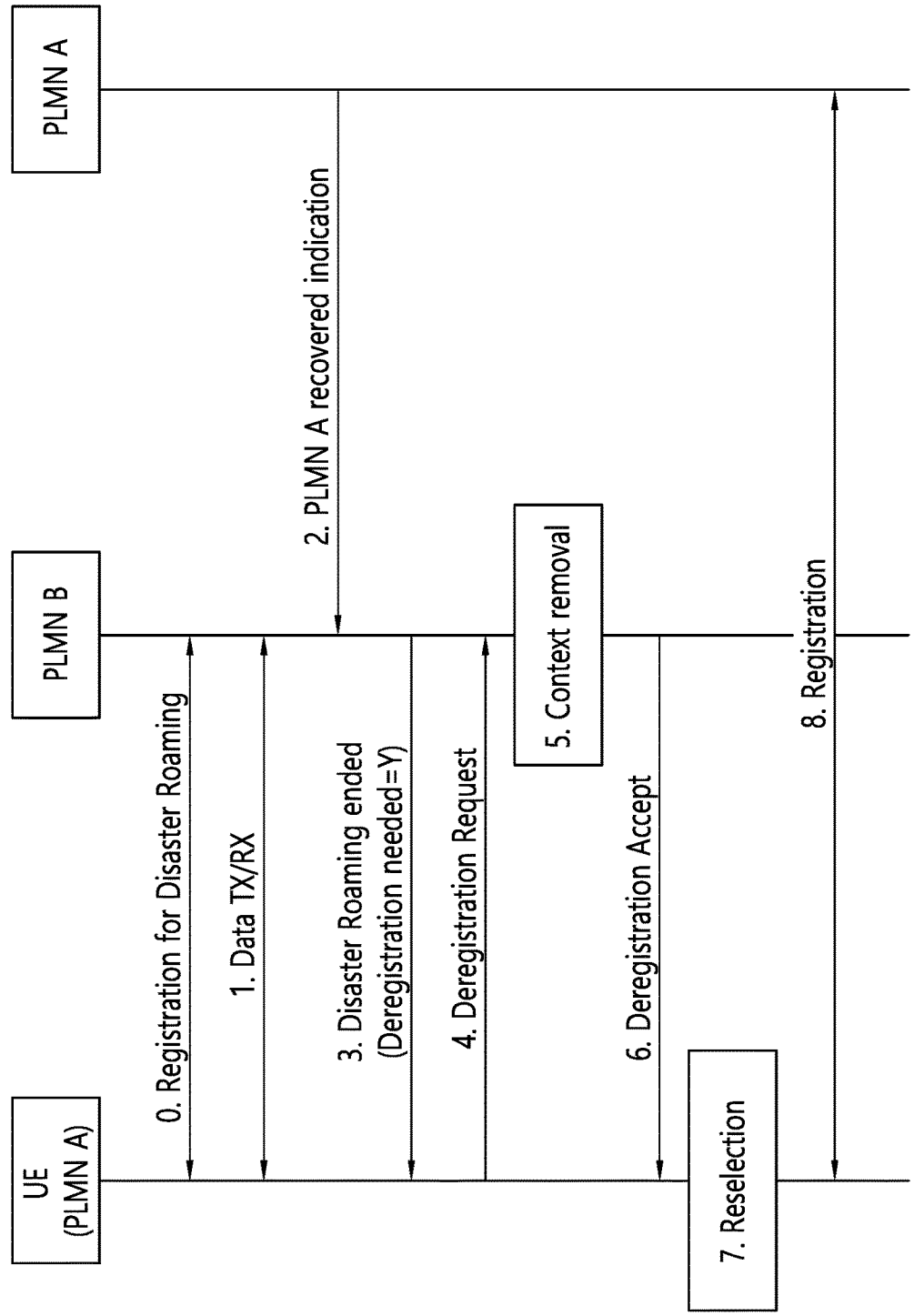
FIG. 9 shows an example of a business operator change according to one disclosure of the present specification.

FIG. 9 shows an example of a business operator change according to one disclosure of the present specification.

Figure 2:
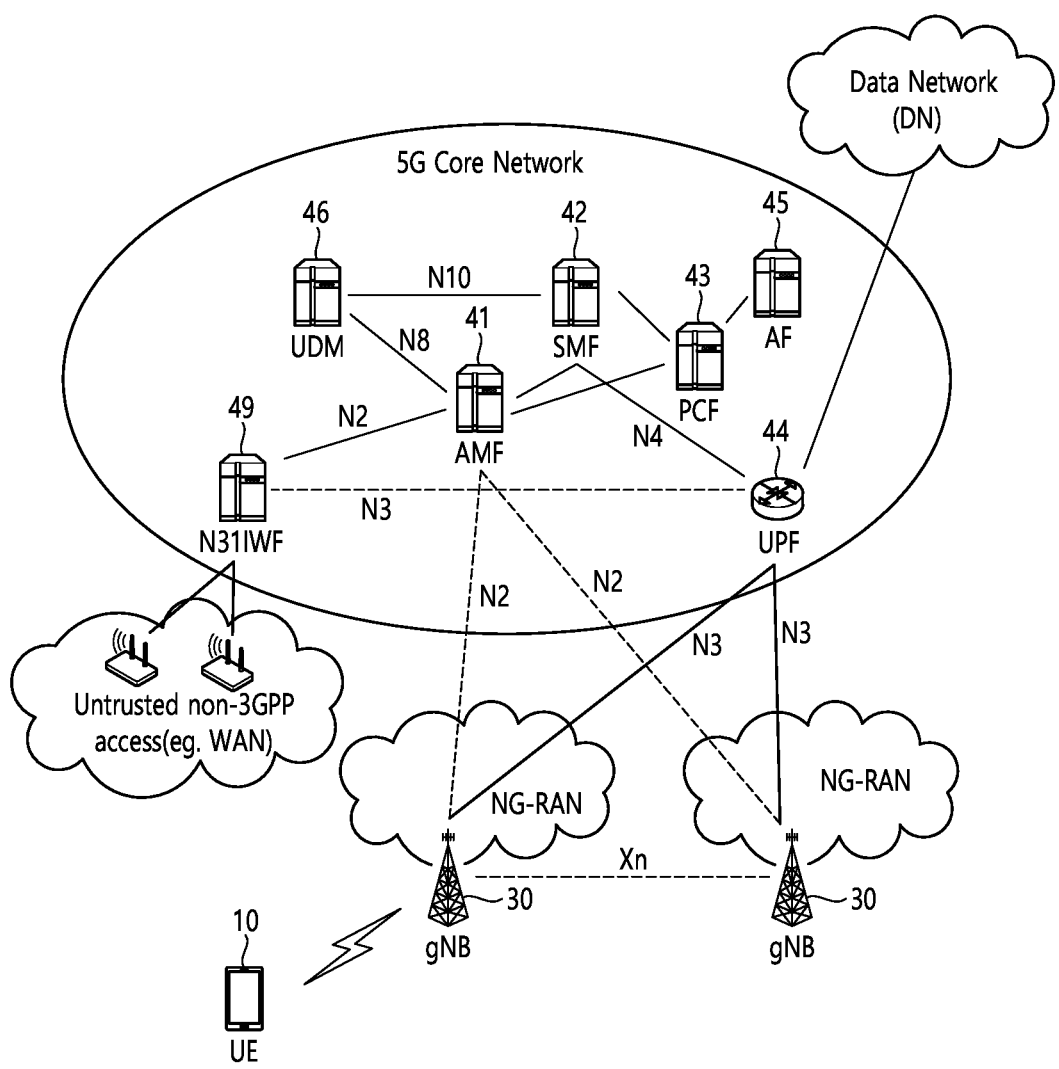
FIG. 2 is a structural diagram of a next-generation mobile communication network.
Figure 3:
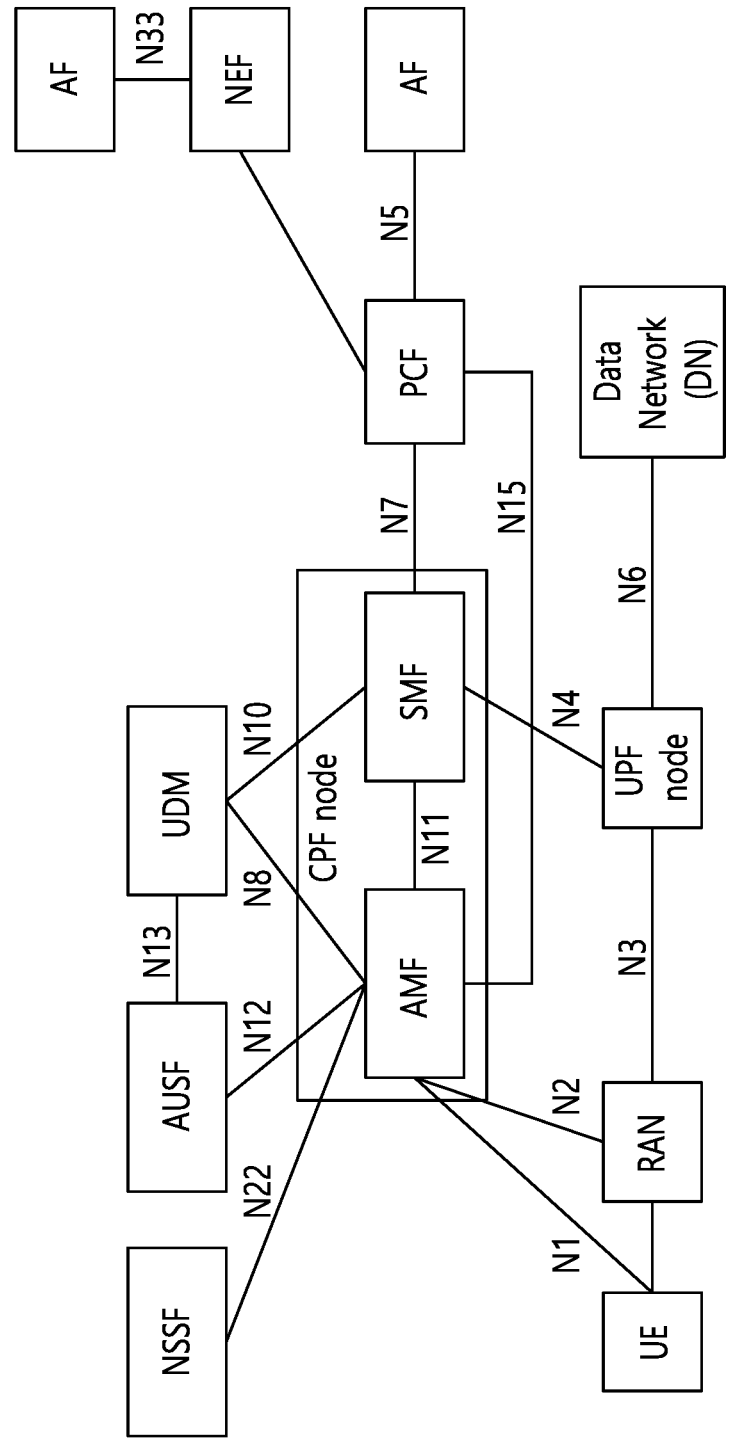
FIG. 3 is an exemplary diagram illustrating an expected structure of next-generation mobile communication from the viewpoint of a node.
Figure 4:
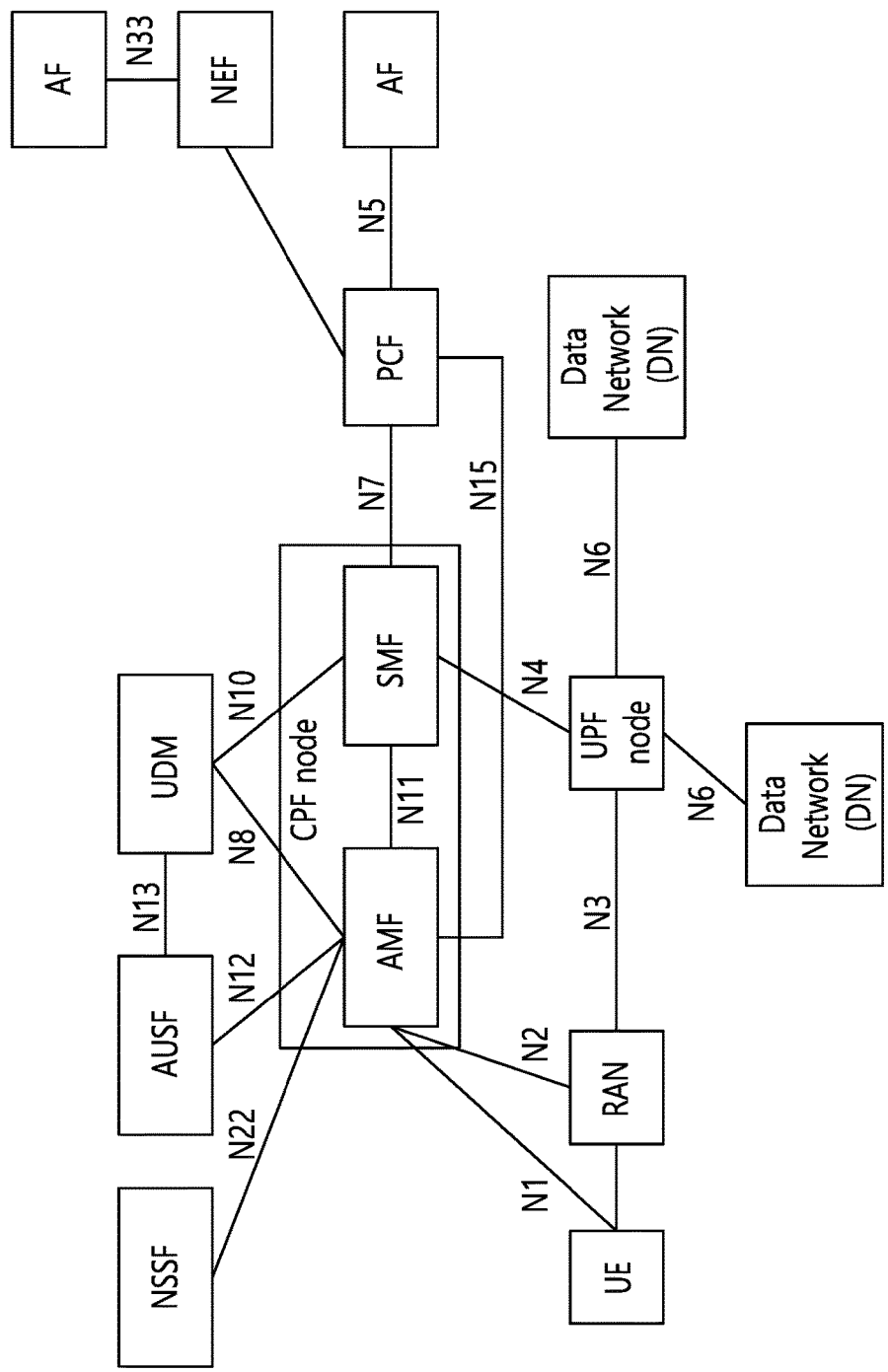
FIG. 4 is an exemplary diagram illustrating an architecture for supporting simultaneous access to two data networks.
Figure 5:
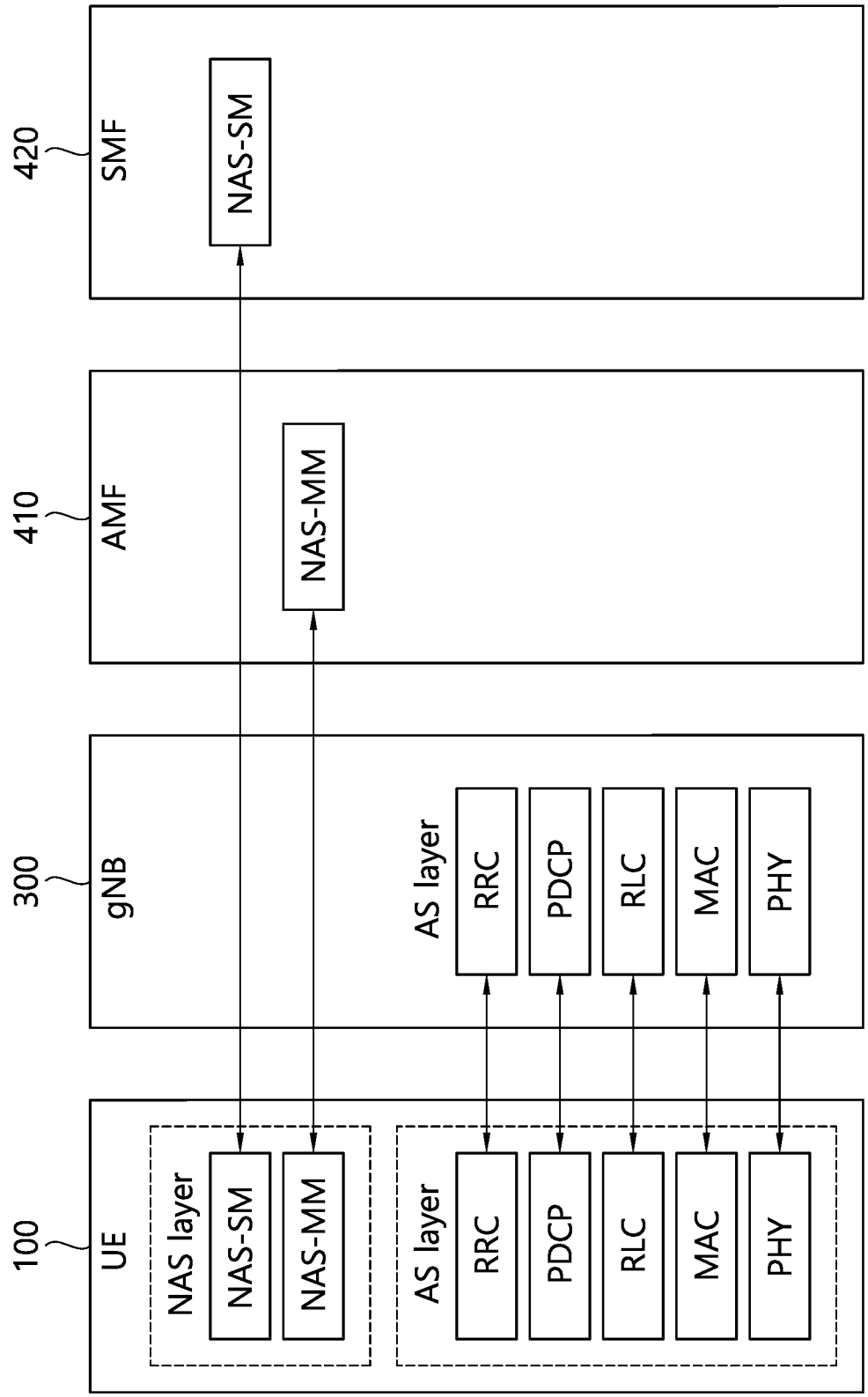
FIG. 5 is another exemplary diagram showing the structure of a radio interface protocol (Radio Interface Protocol) between the UE and the gNB.

The illustrated public land mobile network (PLMN) A corresponds to a network of an operator to which the terminal subscribes, and specific nodes are illustrated in FIGS. 2 and 3. An embodiment of changing the operator using the nodes of the PLMN shown in FIGS. 2 and 3 will be described.

When the terminal subscribed to PLMN A (or the first PLMN) cannot receive the service from PLMN A due to a disaster situation, the terminal may perform a registration procedure with PLMN B (0. Registration for Disaster Roaming) The UE may perform the registration procedure with the AMF of PLMN B.

After the registration procedure is completed, the terminal can use the service through PLMN B. That is, the terminal can transmit and receive data with PLMN B. (1. Data TX/RX)

When the disaster situation of PLMN A ends, the node of PLMN A may notify the end of the disaster situation by sending an accessible message to the node of PLMN B (2. PLMN A recovered indication). For example, in an operation administration management (OAM) system that manages and monitors each node in a network as a whole, when communication services can be provided again in an area previously declared as a disaster area, the OAM system is exposure function), etc., may instruct other PLMNs to transmit information on the recovery. Based on this, the NEF of PLMN A may deliver information to the NEF of PLMN B.

If there is a trust relationship between the OAM system and other PLMNs, the OAM system of PLMN A may directly notify the NEF of PLMN B or the OAM system of PLMN B of the fact of recovery. Based on this, the OAM or NEF of PLMN B informs nodes providing services to the disaster communication terminal in PLMN B, for example, AMF/SMF, etc. can Alternatively, the node of PLMN B may be indirectly notified by using an external public server. A node of PLMN A may notify an external public server (eg, a national institution, a network management server of the Ministry of Information and Communication, etc.) of disaster recovery, and an external public server may notify PLMN B of the fact of disaster recovery. A node of PLMN A uses NEF in communication with the outside, and similarly, a node of PLMN B may use NEF in receiving information to an external network. The OAM or NEF of PLMN B may notify the nodes providing services to the disaster communication terminal in PLMN B, AMF/SMF of PLMN B, etc. of the disaster communication termination instruction or communication service recovery of PLMN A.

The aforementioned disaster situation may include all situations in which the subscriber terminal cannot access the operator PLMN A. Therefore, the end of the disaster situation refers to any situation in which the terminal can use the service by reconnecting to the PLMN A.

As described above, when the NEF of PLMN B becomes aware of the end of the disaster situation of PLMN A, the NEF of PLMN B may notify the AMF/SMF/gNB/eNB of PLMN B of the end of the disaster situation. In this case, the NEF may notify the gNB/eNB of information to be delivered to the UE through a system information block (SIB).

Then, the gNB/eNB may inform the UE that the UE can access PLMN A through the SIB. That is, the gNB/eNB of PLMN B may transmit to the terminal a connection change possible message indicating that the connection can be changed from PLMN B to which the terminal is currently connected to PLMN A (3. Disaster Roaming ended). Such a message may be transmitted through a paging message or the like as well as a method through the SIB. Messages indicating the end of a disaster situation can be conveyed in several ways.

The PLMN B may check whether the UE should perform a deregistration procedure for the PLMN B or not. The terminal may also check whether it is necessary to perform the above-described registration cancellation procedure.

The access changeable message may include information on whether or not the terminal should perform a deregistration procedure for PLMN B together with information indicating that the disaster situation has ended.

If the AMF, SMF, or PCF of PLMN B transmits information that a registration cancellation procedure is required to the terminal, the terminal may perform the registration cancellation procedure with PLMN B. As a deregistration procedure, the UE may transmit a deregistration request message to the AMF of PLMN B (4. Deregistration Request).

The AMF or SMF or UDM of PLMN B may delete the ID (identity) of the terminal in the context in which there is a list of terminals providing the service (5. Context removal). The context may include a list of IDs of terminals that want to provide a service in the PLMN. Contexts can be distributed across multiple nodes within the network. Upon receiving the registration cancellation request message, the AMF may delete the contents of the corresponding terminal in the context it stores. Furthermore, the contents of the corresponding terminal can be deleted from the context of each node through signaling with each node such as SMF, PCF, and UDM.

The AMF of PLMN B may send a registration cancellation approval message informing the terminal that the registration of the corresponding terminal has been canceled (6. Deregistration Accept). Then, the terminal may transition to the registration cancellation state.

The UE may perform a PLMN reselection procedure (7. Reselection). The UE may start searching sequentially from a PLMN having a higher priority in the PLMN list stored by the UE, and when a corresponding PLMN is found, select it and perform a registration procedure to be described later. In the embodiment of the present specification, PLMN A may be selected because the PLMN A to which the terminal has subscribed has a high priority and the connection will be possible after the disaster situation is over.

If PLMN B delivers information that the registration cancellation procedure can be omitted to the terminal, the terminal immediately transitions to the registration cancellation state without the registration cancellation procedure with PLMN B, and then performs the registration procedure with PLMN A, which will be described later. do. The PLMN B may delete the ID of the terminal in the context of the list of terminals providing its own service without a request to cancel the registration of the terminal (5. Context removal). The context may include a list of IDs of terminals that want to provide a service in the PLMN. Contexts can be distributed across multiple nodes within the network. Upon receiving the registration cancellation request message, the AMF may delete the contents of the corresponding terminal in the context it stores. Furthermore, the contents of the corresponding terminal can be deleted from the context of each node through signaling with each node such as SMF, PCF, and UDM.

The UE may perform a registration procedure with PLMN A. The registration procedure with the terminal may be performed by the AMF of PLMN A. The UE may transmit a registration request message to the AMF of PLMN A. The AMF of PLMN A may transmit a registration request approval message to the terminal. Then, the terminal may access the PLMN A and use the service.

Figure 10:
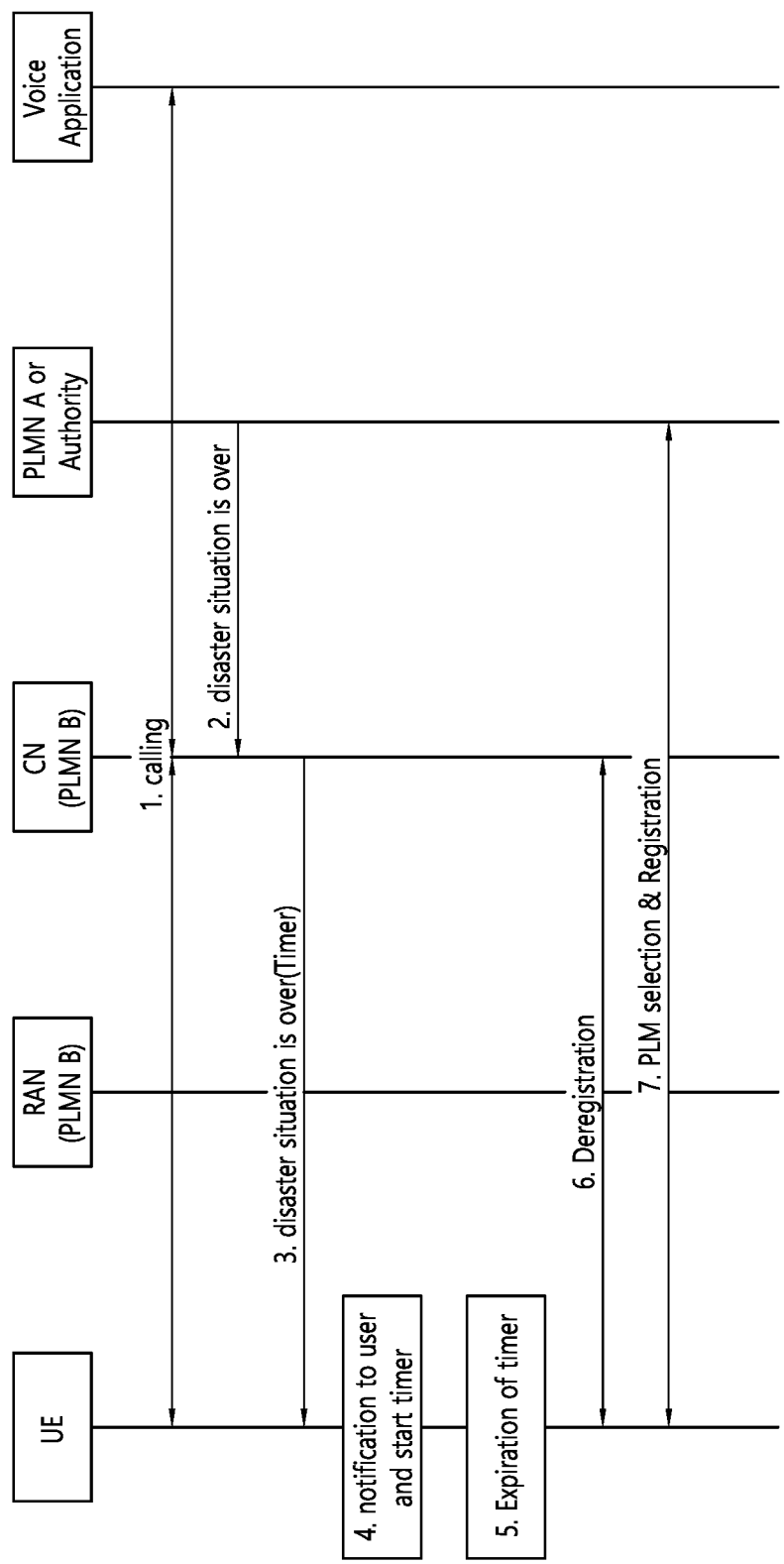
FIG. 10 shows an example of a business operator change according to one disclosure of the present specification.

FIG. 10 shows an example of a business operator change according to one disclosure of the present specification.

When the terminal subscribing to PLMN A cannot receive the service from PLMN A due to a disaster situation, PLMN B may provide the service to the terminal. The service may include data transmission/reception and voice call. In the case of a voice call, the terminal may communicate with the voice call application through PLMN B.

When the disaster situation of PLMN A is terminated, the node of PLMN A may transmit an accessible message to PLMN B to inform that the disaster situation has ended. For example, in the OAM system that manages and monitors each node in the network as a whole, when it becomes possible to provide communication service again in an area previously declared as a disaster area, the OAM system informs other PLMNs through NEF, etc. You can instruct them to pass on information about recovery. Based on this, the NEF can deliver information to other PLMNs.

If there is a trust relationship between the OAM system and other PLMNs, the OAM system of PLMN A may directly notify the NEF of PLMN B or the OAM system of PLMN B of the fact of recovery. Based on this, the OAM or NEF of PLMN B informs nodes (for example, AMF/SMF, etc.) providing services to the disaster communication terminal in PLMN B.

Alternatively, an external public server may be used to indirectly inform other PLMNs. PLMN A may notify an external public server (eg, a national organization, a network management server of the Ministry of Information and Communication) of the disaster recovery fact, and an external public server may notify PLMN B of the disaster recovery fact. PLMN A may use NEF in communication with the outside, and PLMN B may use NEF in receiving information to an external network. The OAM or NEF of PLMN B may notify the nodes providing services to the disaster communication terminal in PLMN B, AMF/SMF of PLMN B, etc. of the disaster communication termination instruction or communication service recovery of PLMN A.

The aforementioned disaster situation may include all situations in which the subscriber terminal cannot access the operator PLMN A. Therefore, the end of the disaster situation refers to any situation in which the terminal can use the service by reconnecting to the PLMN A.

As described above, when the NEF of PLMN B becomes aware of the end of the disaster situation of PLMN A, the NEF of PLMN B may notify the AMF/SMF of PLMN B of the end of the disaster situation. In this case, the NEF may notify the gNB/eNB of information to be delivered to the UE through a system information block (SIB). Then, the gNB/eNB may inform the UE that the UE can access PLMN A through the SIB. That is, the gNB/eNB of PLMN B may transmit a connection changeable message to the UE indicating that the connection change from PLMN B to PLMN A to which the UE is currently connected is possible. Such a message may be transmitted through a paging message or the like as well as a method through the SIB. Messages indicating the end of a disaster situation can be conveyed in several ways.

The access changeable message may include information on whether or not the terminal should perform a deregistration procedure for PLMN B together with information indicating that the disaster situation has ended.

In addition, the gNB/eNB of PLMN B may include information informing that the communication service or connection by PLMN B will be terminated soon in the connection changeable message, and additionally information related to the time when communication service interruption or connection termination, etc. will occur (timer) can be included and transmitted to the terminal. That is, the gNB/eNB of the PLMN B may inform the UE that a registration cancellation procedure, etc., which will be described later, may be performed after the time of the timer has elapsed.

The terminal may start a timer and inform the user of information about the timer. If there is no special action by the user during the time of the timer, the terminal may proceed with the registration cancellation procedure at the same time as the time of the timer expires. Meanwhile, in this process, PLMN B may also start a timer. Therefore, when the time of the timer expires, PLMN B may perform a registration cancellation procedure and the like.

If the node of PLMN B transmits information indicating that the registration cancellation procedure is required to the terminal, the terminal may perform the registration cancellation procedure with the PLMN B simultaneously with the expiration of the timer. As a registration cancellation procedure, first, the terminal may transmit a registration cancellation request message to the AMF of PLMN B. PLMN B may delete the ID (identity) of the terminal in the context it manages. In this process, the PLMN B may start a timer separately, and may delete the ID of the terminal from the context at the same time as the timer ends without a request message for deregistration of the terminal. The context may include a list of IDs of terminals that want to provide a service in the PLMN. Contexts can be distributed across multiple nodes within the network. Upon receiving the registration cancellation request message, the AMF may delete the contents of the corresponding terminal in the context it stores. Furthermore, the contents of the corresponding terminal can be deleted from the context of each node through signaling with each node such as SMF, PCF, and UDM. Furthermore, the terminal does not request a service to PLMN B after the time expires, and PLMN B may not provide a service to the corresponding terminal.

The PLMN B may send a registration cancellation approval message informing the terminal that the registration of the corresponding terminal has been canceled. Then, the terminal may transition to the registration cancellation state.

The UE may perform a PLMN reselection procedure. The UE may start searching sequentially from a PLMN having a higher priority in the PLMN list stored by the UE, and when a corresponding PLMN is found, select it and perform a registration procedure to be described later. In the embodiment of the present specification, PLMN A may be selected because the PLMN A to which the terminal has subscribed has a high priority and the connection will be possible after the disaster situation is over.

If the node of PLMN B delivers information indicating that the registration cancellation procedure can be omitted, the terminal immediately transits to the registration cancellation state without the registration cancellation procedure with PLMN B at the end of the timer, as described above. By selecting a PLMN, a registration procedure with PLMN A, which will be described later, is performed. Meanwhile, the PLMN B may delete the ID of the terminal from the context it manages at the same time as the timer expires without a request to cancel the registration of the terminal. Contexts can be distributed across multiple nodes within the network. Upon receiving the registration cancellation request message, the AMF may delete the contents of the corresponding terminal in the context it stores. Furthermore, the contents of the corresponding terminal can be deleted from the context of each node through signaling with each node such as SMF, PCF, and UDM. That is, after the time expires, the PLMN B may no longer provide a service to the terminal.

The UE may perform a registration procedure with PLMN A. The UE may transmit a registration request message to the AMF of PLMN A. The AMF of PLMN A may transmit a registration request approval message to the terminal. Then, the terminal can access the PLMN A and use the service. That is, the terminal can resume use of the application used.

Figure 11:
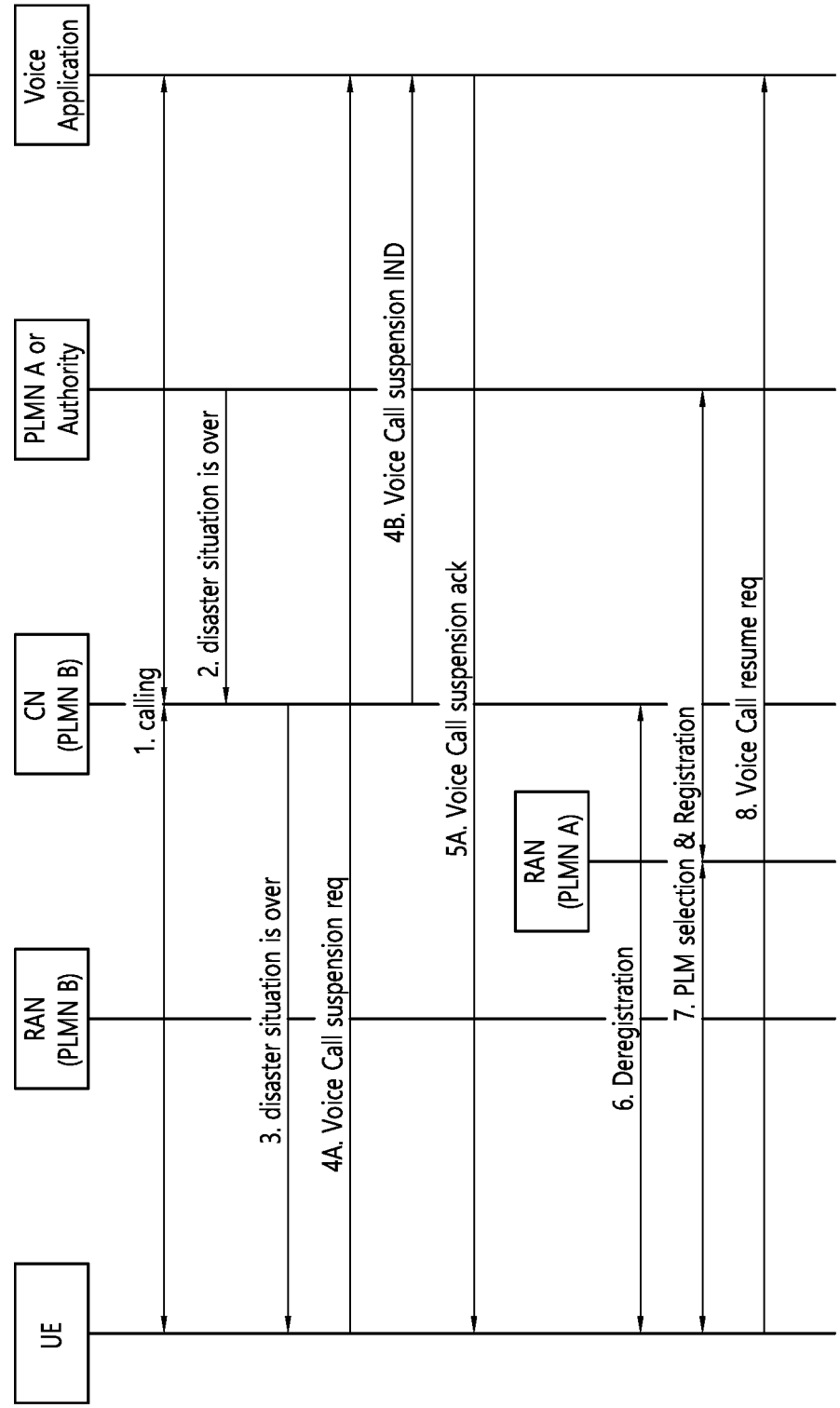
FIG. 11 shows an example of changing a business operator during a voice call according to the disclosure of the present specification.

FIG. 11 shows an example of changing a business operator during a voice call according to the disclosure of the present specification.

In the above-described examples, since the use of the service is resumed after the connection with PLMN B is cut while the service is used and the connection with PLMN A is performed, the service use cannot be prevented from being cut off. In the case of data transmission and reception, it is difficult for the user to feel the communication cut for a while, but in the case of a voice call, if the connection is disconnected even for a short time, it is very easy for the user to feel it. Therefore, in the case of voice calls, the following special measures are required.

The terminal may use the voice call service by communicating with the voice call application server through the connected PLMN B.

When the disaster situation of PLMN A is terminated, the PLMN A may transmit an accessible message to PLMN B to inform that the disaster situation has ended. For example, in an operation administration management (OAM) system that manages and monitors each node in a network as a whole, when communication services can be provided again in an area previously declared as a disaster area, the OAM system is exposure function), etc., may instruct other PLMNs to transmit information on the recovery. Based on this, the NEF may deliver information to other PLMNs.

If there is a trust relationship between the OAM system and other PLMNs, the OAM system of PLMN A may directly notify the NEF of PLMN B or the OAM system of PLMN B of the fact of recovery. Based on this, the OAM or NEF of PLMN B informs nodes (for example, AMF/SMF, etc) providing services to the disaster communication terminal in PLMN B.

Alternatively, an external public server may be used to indirectly inform other PLMNs. PLMN A may notify an external public server (eg, a national organization, a network management server of the Ministry of Information and Communication) of the disaster recovery fact, and an external public server may notify PLMN B of the disaster recovery fact. PLMN A may use NEF in communication with the outside, and PLMN B may use NEF in receiving information to an external network. The OAM or NEF of PLMN B may notify of the disaster communication termination instruction or communication service recovery of PLMN A to the nodes providing services to the disaster communication terminal in PLMN B, AMF/SMF of PLMN B, etc.

The aforementioned disaster situation may include all situations in which the subscriber terminal cannot access the operator PLMN A. Therefore, the end of the disaster situation refers to any situation in which the terminal can use the service by reconnecting to the PLMN A.

As described above, when the NEF of PLMN B becomes aware of the end of the disaster situation of PLMN A, the NEF of PLMN B may notify the AMF/SMF of PLMN B of the end of the disaster situation. In this case, the NEF may notify the gNB/eNB of information to be delivered to the UE through a system information block (SIB). Then, the gNB/eNB may inform the UE that the UE can access PLMN A through the SIB. That is, the gNB/eNB of PLMN B may transmit a connection changeable message to the UE indicating that the connection change from PLMN B to PLMN A to which the UE is currently connected is possible. Such a message may be transmitted through a paging message or the like as well as a method through the SIB. Messages indicating the end of a disaster situation can be conveyed in several ways. The access changeable message may include information on whether or not to perform a deregistration procedure for PLMN B together with information indicating that the disaster situation has ended. In addition, the PLMN B may include information about the timer as described above in FIG. 10 in the message, and the subsequent process may be the same as described above.

When there is an ongoing voice call, the terminal may request that the voice call be temporarily switched to a hold state by sending a connection maintenance request message to the voice call application server. In addition, the PLMN B may also request that the voice call be temporarily switched to a hold state by sending a connection maintenance request message directly to the voice call application server.

For example, if the AMF in charge of the registration status of PLMN B recognizes the disaster termination situation of PLMN A from the NEF as described above, it may recognize that registration with PLMN B will be canceled later and notify the PCF or NEF. Then, the PCF or the NEF may transmit a connection maintenance request message to the P-CSCF or S-CSCF of the IMS domain. The P-CSCF or S-CSCF may transmit a connection maintenance request message to the voice call application server. Alternatively, when the SMF in charge of the PDU session state in PLMN B recognizes the disaster termination situation of PLMN A from the NEF as described above, it may recognize that registration with PLMN B will be canceled later and notify the PCF or NEE Then, the PCF or the NEF may transmit a connection maintenance request message to the P-CSCF or S-CSCF of the IMS domain. The P-CSCF or S-CSCF may transmit a connection maintenance request message to the voice call application server.

The voice call application server may determine whether to switch the voice call to a hold state for a while in response to this, and transmit the result to the terminal. The voice call application server may send a connection maintenance request approval message to the terminal when switching to the maintenance state. At this time, the voice call application server may also transmit information about the time limit for the terminal to change the PLMN to access the voice call application server again to the terminal. When the voice call resume request message of the terminal to be described later is not received by the voice call application server within the time limit, the voice call application server may perform a process for terminating the voice call of the terminal.

The UE may perform a PLMN reselection procedure. The UE may start searching sequentially from a PLMN having a higher priority in the PLMN list stored by the UE, and when a corresponding PLMN is found, select it and perform a registration procedure to be described later. In the embodiment of the present specification, PLMN A may be selected because the PLMN A to which the terminal has subscribed has a high priority and the connection will be possible after the disaster situation is over.

The UE may perform a registration procedure with PLMN A. The UE may transmit a registration request message to PLMN A. PLMN A may transmit a registration request approval message to the terminal. In this case, the terminal may transmit identification information of the voice call application used in PLMN B, for example, related information of P-CSCF to the SMF of PLMN A. The UE may include the corresponding information when requesting a registration or requesting a PDU session. Applications such as the voice call application used in PLMN B can be resumed.

Since the PLMN change is completed, the terminal can resume the voice call by sending a voice call resume request message to the voice call application server.

Through the above process, the interruption of the voice call service can be minimized, thereby reducing the user's inconvenience. The above-described embodiment is not limited to voice calls and may be applied to other applications. It can be applied to all applications that need to reduce the disconnection of communication.

The contents described so far may be implemented in hardware. This will be described with reference to FIG. 12.

<Devices in General to Which the Disclosure of the Present Specification May Be Applied>

An apparatus to which the disclosure of the present specification can be applied will be described.

Figure 12:
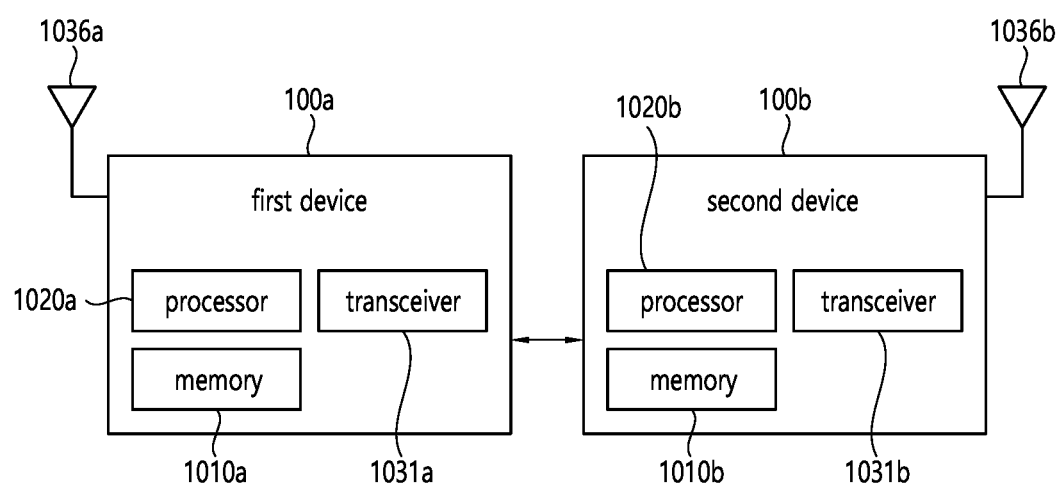
FIG. 12 shows an apparatus according to an embodiment.

FIG. 12 shows an apparatus according to an embodiment.

Referring to FIG. 12, a wireless communication system may include a first device (100a) and a second device (100b).

The first device (100a) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100b) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

For example, the terminal includes a mobile phone, a smart phone, a laptop computer, a digital broadcasting terminal, personal digital assistants (PDA), a portable multimedia player (PMP), a navigation system, a slate PC, and a tablet. PC (tablet PC), ultrabook (ultrabook), wearable device (wearable device, for example, a watch-type terminal (smartwatch), glass-type terminal (smart glass), HMD (head mounted display), etc. may be included. For example, the HMD may be a display device worn on the head. For example, an HMD may be used to implement VR, AR or MR.

For example, the drone may be a flying vehicle that does not have a human and flies by a wireless control signal. For example, the VR device may include a device that implements an object or a background of a virtual world. For example, the AR device may include a device implemented by connecting an object or background of the virtual world to an object or background of the real world. For example, the MR device may include a device that implements a virtual world object or background by fusion with a real world object or background. For example, the hologram device may include a device for realizing a 360-degree stereoscopic image by recording and reproducing stereoscopic information by utilizing an interference phenomenon of light generated by the meeting of two laser beams called holography. For example, the public safety device may include an image relay device or an image device that can be worn on a user's body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, a medical device may be a device used for the purpose of diagnosing, treating, alleviating, treating, or preventing a disease. For example, a medical device may be a device used for the purpose of diagnosing, treating, alleviating or correcting an injury or disorder. For example, a medical device may be a device used for the purpose of examining, replacing, or modifying structure or function. For example, the medical device may be a device used for the purpose of controlling pregnancy. For example, the medical device may include a medical device, a surgical device, an (ex vivo) diagnostic device, a hearing aid, or a device for a procedure. For example, the security device may be a device installed to prevent a risk that may occur and to maintain safety. For example, the security device may be a camera, CCTV, recorder or black box. For example, the fintech device may be a device capable of providing financial services such as mobile payment. For example, the fintech device may include a payment device or a Point of Sales (POS). For example, the climate/environment device may include a device for monitoring or predicting the climate/environment.

The first device (100a) includes at least one processor, such as a processor (1020a), and at least one memory, such as a memory (1010a), it may include at least one transceiver, such as transceiver (1031a). The processor (1020a) may perform the functions, procedures, and/or methods described above. The processor (1020a) may perform one or more protocols. For example, the processor (1020a) may perform one or more layers of an air interface protocol. The memory (1010a) is connected to the processor (1020a) and may store various types of information and/or commands. The transceiver (1031a) may be connected to the processor (1020a) and may be controlled to transmit/receive a wireless signal.

The second device (100b) may include at least one processor such as a processor (1020b), at least one memory device such as a memory (1010b), and at least one transceiver such as a transceiver (1031b). The processor (1020b) may perform the functions, procedures, and/or methods described above. The processor (1020b) may implement one or more protocols. For example, the processor (1020b) may implement one or more layers of an air interface protocol. The memory (1010b) is connected to the processor (1020b) and may store various types of information and/or commands. The transceiver (1031b) may be connected to the processor (1020b) and may be controlled to transmit/receive a wireless signal.

The memory (1010a) and/or the memory (1010b) may be respectively connected inside or outside the processor (1020a) and/or the processor (1020b), and may be connected to other processors through various technologies such as wired or wireless connection.

The first device (100a) and/or the second device (100b) may have one or more antennas. For example, antenna (1036a) and/or antenna (1036b) may be configured to transmit and receive wireless signals.

Figure 13:
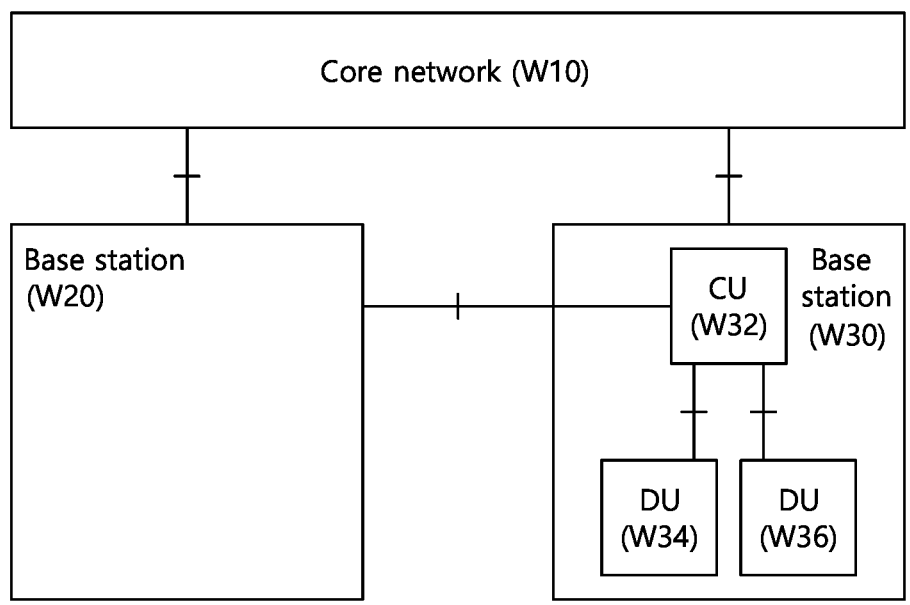
FIG. 13 illustrates a block diagram of a network node according to an embodiment.

FIG. 13 illustrates a block diagram of a network node according to an embodiment.

In particular, FIG. 13 is a diagram illustrating the network node of FIG. 12 in more detail when the base station is divided into a central unit (CU) and a distributed unit (DU).

Referring to FIG. 13, base stations W20 and W30 may be connected to the core network W10, and the base station W30 may be connected to a neighboring base station W20. For example, the interface between the base stations W20 and W30 and the core network W10 may be referred to as NG, and the interface between the base station W30 and the neighboring base station W20 may be referred to as Xn.

The base station W30 may be divided into CUs W32 and DUs W34 and W36. That is, the base station W30 may be hierarchically separated and operated. The CU W32 may be connected to one or more DUs W34 and W36, for example, an interface between the CU W32 and the DUs W34 and W36 may be referred to as F1. The CU (W32) may perform functions of upper layers of the base station, and the DUs (W34, W36) may perform functions of lower layers of the base station. For example, the CU W32 is a radio resource control (RRC), service data adaptation protocol (SDAP), and packet data convergence protocol (PDCP) layer of a base station (eg, gNB) hosting a logical node (logical node), and the DUs W34 and W36 may be logical nodes hosting radio link control (RLC), media access control (MAC), and physical (PHY) layers of the base station. Alternatively, the CU W32 may be a logical node hosting the RRC and PDCP layers of the base station (eg, en-gNB).

The operation of the DUs W34 and W36 may be partially controlled by the CU W32. One DU (W34, W36) may support one or more cells. One cell can be supported by only one DU (W34, W36). One DU (W34, W36) may be connected to one CU (W32), and by appropriate implementation, one DU (W34, W36) may be connected to a plurality of CUs.

Figure 14:
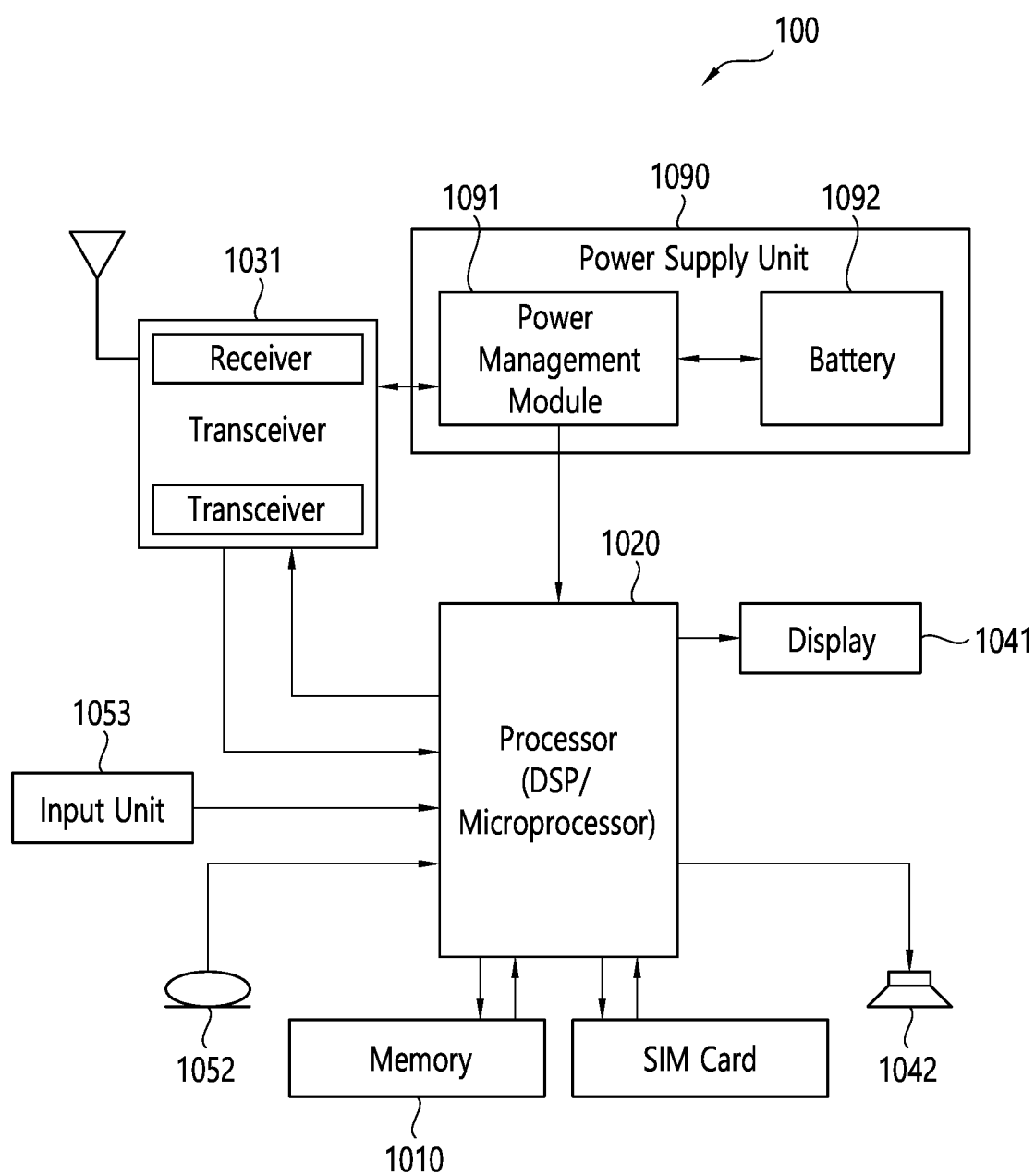
FIG. 14 is a block diagram illustrating the configuration of a terminal according to an embodiment.

FIG. 14 is a block diagram illustrating the configuration of a terminal according to an embodiment.

In particular, FIG. 14 is a diagram illustrating the apparatus of FIG. 12 in more detail above.

The device includes a memory (1010), a processor (1020), a transceiver (1031), a power management module (1091), a battery (1092), a display (1041), an input unit (1053), a speaker (1042) and a microphone (1052), SIM (subscriber identification module) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP (application processor). The processor (1020) may include at least one of a DSP (digital signal processor), a CPU (central processing unit), a GPU (graphics processing unit), and a modem (modulator and demodulator). Examples of processor (1020) include SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input (1053) receives input to be used by processor (1020). The input unit (1053) may be displayed on the display (1041). A SIM card is an integrated circuit used to securely store an IMSI (international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM (read-only memory), RAM (random access memory), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

<Scenario to which the Disclosure of this Specification can be Applied>

Hereinafter, a scenario to which the foregoing disclosures can be applied will be described.

In the present specification, an always-on PDU session for URLLC having a characteristic of low latency may be used for artificial intelligence, robot, autonomous driving, extended reality, etc. among the 5G scenarios below.

Figure 15:
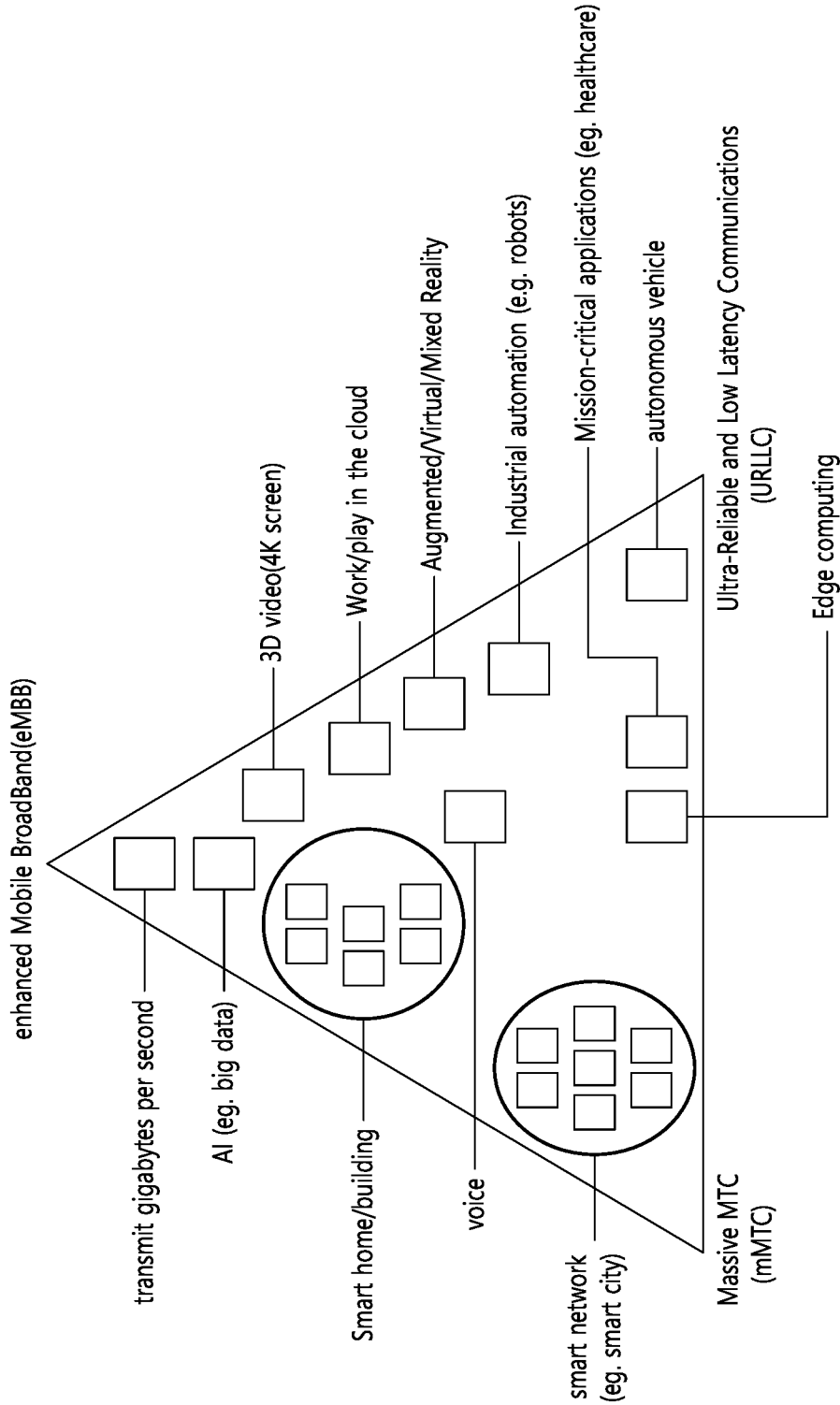
FIG. 15 shows an example of a 5G usage scenario.

FIG. 15 shows an example of a 5G usage scenario.

The 5G usage scenario shown in FIG. 15 is merely exemplary, and the technical features presented herein may be applied to other 5G usage scenarios not shown in FIG. 15.

Referring to FIG. 15, the three main requirement areas of 5G are (1) enhanced mobile broadband (eMBB) area, (2) massive machine type communication (mMTC) area, and (3) high reliability/It covers the realm of ultra-reliable and low latency communications (URLLC). Some use cases may require multiple domains for optimization, while other use cases may focus on only one key performance indicator (KPI). 5G is to support these various use cases in a flexible and reliable way.

eMBB focuses on overall improvements in data rates, latency, user density, capacity and coverage of mobile broadband connections. eMBB aims for a throughput of around 10 Gbps. eMBB goes far beyond basic mobile internet access, covering rich interactive work, media and entertainment applications in the cloud or augmented reality. Data is one of the key drivers of 5G, and for the first time in the 5G era, we may not see dedicated voice services. In 5G, voice is simply expected to be processed as an application program using the data connection provided by the communication system. The main reasons for the increased amount of traffic are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to users. Cloud storage and applications are rapidly increasing in mobile communication platforms, which can be applied to both work and entertainment. Cloud storage is a special use case that drives the growth of uplink data rates. 5G is also used for remote work on the cloud, requiring much lower end-to-end latency to maintain a good user experience when tactile interfaces are used. In entertainment, for example, cloud gaming and video streaming are another key factor demanding improvements in mobile broadband capabilities. Entertainment is essential on smartphones and tablets anywhere, including in high-mobility environments such as trains, cars and airplanes. Another use example is augmented reality for entertainment and information retrieval. Here, augmented reality requires very low latency and instantaneous amount of data.

mMTC is designed to enable communication between a large number of low-cost devices powered by batteries and is intended to support applications such as smart metering, logistics, field and body sensors. mMTC is targeting a battery life of 10 years or so and/or a million devices per square kilometer. mMTC enables the seamless connection of embedded sensors in all fields to form a sensor network, and is one of the most anticipated 5G use cases. Potentially, by 2020, there will be 20.4 billion IoT devices. Smart networks leveraging industrial IoT is one of the areas where 5G will play a major role in enabling smart cities, asset tracking, smart utilities, agriculture and security infrastructure.

URLLC enables devices and machines to communicate very reliably, with very low latency and high availability, enabling autonomous vehicle-to-vehicle communication and control, industrial control, factory automation, mission-critical applications such as telesurgery and healthcare, smart grid and public Ideal for safety applications. URLLC aims for a delay on the order of 1 ms. URLLC includes new services that will transform industries through high-reliability/ultra-low-latency links such as remote control of critical infrastructure and autonomous vehicles. This level of reliability and latency is essential for smart grid control, industrial automation, robotics, and drone control and coordination.

Next, a plurality of usage examples included in the triangle of FIG. 15 will be described in more detail.

5G could complement fiber-to-the-home (FTTH) and cable-based broadband (or DOCSIS) as a means of delivering streams rated at hundreds of megabits per second to gigabits per second. Such high speed may be required to deliver TVs with resolutions of 4K or higher (6K, 8K and higher) as well as virtual reality (VR) and augmented reality (AR). VR and AR applications almost include immersive sporting events. Certain applications may require special network settings. For VR games, for example, game companies may need to integrate core servers with network operators' edge network servers to minimize latency.

Automotive is expected to be an important new driving force for 5G, with many use cases for mobile communication to vehicles. For example, entertainment for passengers requires both high capacity and high mobile broadband. The reason is that future users continue to expect high-quality connections regardless of their location and speed. Another example of use in the automotive sector is augmented reality dashboards. The augmented reality contrast board allows drivers to identify objects in the dark above what they are seeing through the front window. The augmented reality dashboard superimposes information to inform the driver about the distance and movement of objects. In the future, wireless modules will enable communication between vehicles, information exchange between vehicles and supporting infrastructure, and information exchange between automobiles and other connected devices (eg, devices carried by pedestrians). Safety systems can lower the risk of accidents by guiding drivers through alternative courses of action to help them drive safer. The next step will be remote-controlled vehicles or autonomous vehicles. This requires very reliable and very fast communication between different autonomous vehicles and/or between vehicles and infrastructure. In the future, autonomous vehicles will perform all driving activities, allowing drivers to focus only on traffic anomalies that the vehicle itself cannot discern. The technological requirements of autonomous vehicles demand ultra-low latency and ultra-fast reliability to increase traffic safety to unattainable levels for humans.

Smart cities and smart homes, referred to as smart societies, will be embedded as high-density wireless sensor networks as examples of smart networks. A distributed network of intelligent sensors will identify conditions for keeping a city or house cost- and energy-efficient. A similar setup can be performed for each household. Temperature sensors, window and heating controllers, burglar alarms and appliances are all connected wirelessly. Many of these sensors typically require low data rates, low power and low cost. However, for example, real-time HD video may be required in certain types of devices for surveillance.

The consumption and distribution of energy, including heat or gas, is highly decentralized, requiring automated control of distributed sensor networks. Smart grids use digital information and communication technologies to interconnect these sensors to gather information and act on it. This information can include supplier and consumer behavior, enabling smart grids to improve efficiency, reliability, economics, sustainability of production and distribution of fuels such as electricity in an automated manner. The smart grid can also be viewed as another low-latency sensor network.

The health sector has many applications that can benefit from mobile communications. The communication system may support telemedicine providing clinical care from a remote location. This can help reduce barriers to distance and improve access to consistently unavailable health care services in remote rural areas. It is also used to save lives in critical care and emergency situations. A wireless sensor network based on mobile communication may provide remote monitoring and sensors for parameters such as heart rate and blood pressure.

Wireless and mobile communications are becoming increasingly important in industrial applications. Wiring is expensive to install and maintain. Thus, the possibility of replacing cables with reconfigurable radio links is an attractive opportunity for many industries. Achieving this, however, requires that wireless connections operate with similar delays, reliability and capacity as cables, and that their management is simplified. Low latency and very low error probability are new requirements that need to be connected with 5G.

Logistics and freight tracking are important use cases for mobile communications that use location-based information systems to enable tracking of inventory and packages from anywhere. Logistics and freight tracking use cases typically require low data rates but require wide range and reliable location information.

<AI: Artificial Intelligence>

Artificial intelligence refers to a field that studies artificial intelligence or methodologies that can create it, and machine learning refers to a field that defines various problems dealt with in the field of artificial intelligence and studies methodologies to solve them. do. Machine learning is also defined as an algorithm that improves the performance of a certain task through constant experience.

An artificial neural network (ANN) is a model used in machine learning, and may refer to an overall model having problem-solving ability, which is composed of artificial neurons (nodes) that form a network by combining synapses. An artificial neural network may be defined by a connection pattern between neurons of different layers, a learning process that updates model parameters, and an activation function that generates an output value.

The artificial neural network may include an input layer, an output layer, and optionally one or more hidden layers. Each layer includes one or more neurons, and the artificial neural network may include neurons and synapses connecting neurons. In the artificial neural network, each neuron may output a function value of an activation function for input signals, weights, and biases input through synapses.

Model parameters refer to parameters determined through learning, and include the weight of synaptic connections and the bias of neurons. In addition, the hyperparameter refers to a parameter that must be set before learning in a machine learning algorithm, and includes a learning rate, the number of iterations, a mini-batch size, an initialization function, and the like.

The purpose of learning the artificial neural network can be seen as determining the model parameters that minimize the loss function. The loss function may be used as an index for determining optimal model parameters in the learning process of the artificial neural network.

Machine learning can be classified into supervised learning, unsupervised learning, and reinforcement learning according to a learning method.

Supervised learning refers to a method of training an artificial neural network in a state in which a label for the training data is given, and the label is the correct answer (or result value) that the artificial neural network should infer when the training data is input to the artificial neural network. can mean Unsupervised learning may refer to a method of training an artificial neural network in a state where no labels are given for training data. Reinforcement learning can refer to a learning method in which an agent defined in an environment learns to select an action or sequence of actions that maximizes the cumulative reward in each state.

Among artificial neural networks, machine learning implemented as a deep neural network (DNN) including a plurality of hidden layers is also called deep learning, and deep learning is a part of machine learning. Hereinafter, machine learning is used in a sense including deep learning.

<Robot>

A robot can mean a machine that automatically handles or operates a task given by its own capabilities. In particular, a robot having a function of recognizing an environment and performing an operation by self-judgment may be referred to as an intelligent robot.

Robots can be classified into industrial, medical, home, military, etc. depending on the purpose or field of use.

The robot may be provided with a driving unit including an actuator or a motor to perform various physical operations such as moving the robot joints. In addition, the movable robot includes a wheel, a brake, a propeller, and the like in the driving unit, and may travel on the ground or fly in the air through the driving unit.

<Self-Driving, Autonomous-Driving>

Autonomous driving refers to a technology that drives itself, and an autonomous driving vehicle refers to a vehicle that travels without or with minimal user manipulation.

For example, autonomous driving includes technology for maintaining a driving lane, technology for automatically adjusting speed such as adaptive cruise control, technology for automatically driving along a predetermined route, technology for automatically setting a route when a destination is set, etc. All of these can be included.

The vehicle includes a vehicle having only an internal combustion engine, a hybrid vehicle having both an internal combustion engine and an electric motor, and an electric vehicle having only an electric motor, and may include not only automobiles, but also trains, motorcycles, and the like.

In this case, the autonomous vehicle can be viewed as a robot having an autonomous driving function.

<Extended Reality (XR)>

The extended reality is a generic term for virtual reality (VR), augmented reality (AR), and mixed reality (MR). VR technology provides only CG images of objects or backgrounds in the real world, AR technology provides virtual CG images on top of images of real objects, and MR technology is a computer that mixes and combines virtual objects in the real world. graphic technology.

MR technology is similar to AR technology in that it shows both real and virtual objects. However, there is a difference in that in AR technology, a virtual object is used in a form that complements a real object, whereas in MR technology, a virtual object and a real object are used with equal characteristics.

Figure 16:
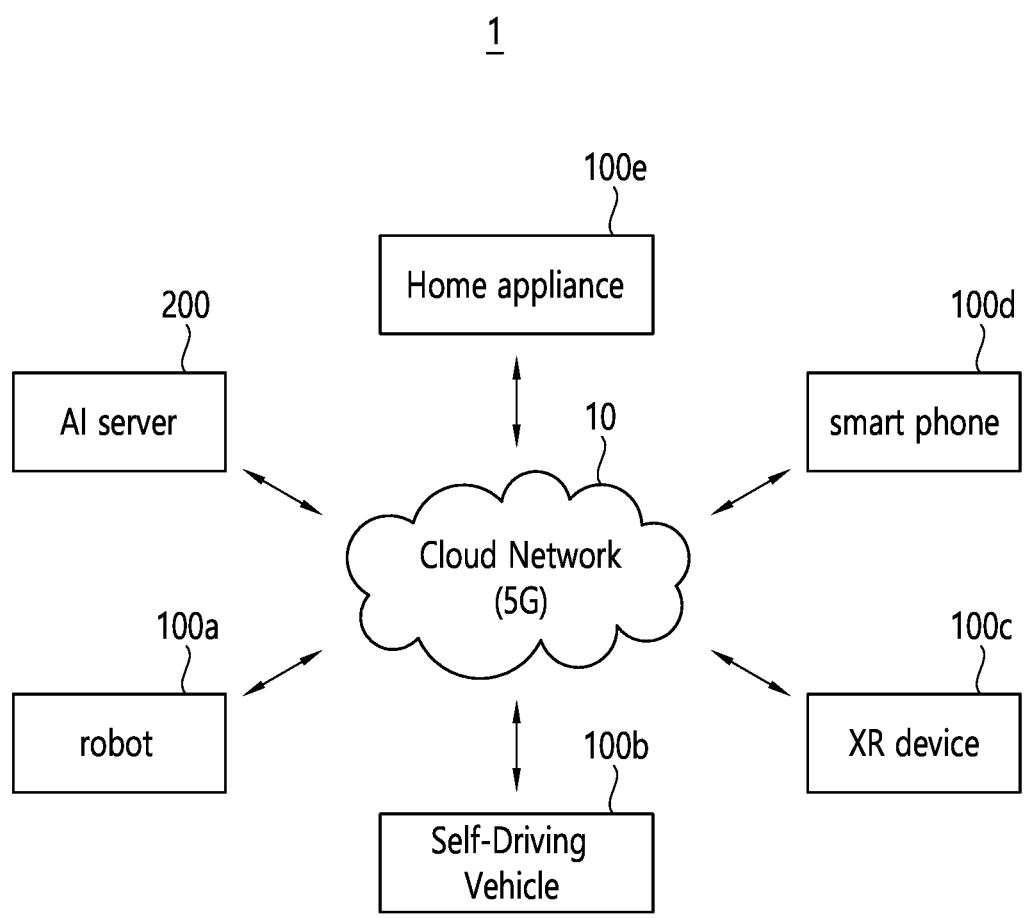
FIG. 16 shows an AI system 1 according to an embodiment.

XR technology can be applied to HMD (Head-Mount Display), HUD (Head-Up Display), mobile phone, tablet PC, laptop, desktop, TV, digital signage, etc. can be called FIG. 16 shows an AI system 1 according to an embodiment.

Referring to FIG. 16, the AI system 1 includes at least one of an AI server 200, a robot 100a, an autonomous vehicle 100b, an XR device 100c, a smartphone 100d, or a home appliance 100e. It is connected to the cloud network 10. Here, the robot 100a to which the AI technology is applied, the autonomous driving vehicle 100b, the XR device 100c, the smart phone 100d, or the home appliance 100e may be referred to as AI devices 100a to 100e.

The cloud network 10 may constitute a part of the cloud computing infrastructure or may refer to a network existing in the cloud computing infrastructure. Here, the cloud network 10 may be configured using a 3G network, a 4G or Long Term Evolution (LTE) network, or a 5G network.

That is, each of the devices 100a to 100e and 200 constituting the AI system 1 may be connected to each other through the cloud network 10. In particular, each of the devices 100a to 100e and 200 may communicate with each other through the base station, but may also directly communicate with each other without passing through the base station.

The AI server 200 may include a server performing AI processing and a server performing an operation on big data.

The AI server 200 includes at least one of the AI devices constituting the AI system 1, such as a robot 100a, an autonomous vehicle 100b, an XR device 100c, a smartphone 100d, or a home appliance 100e, and It is connected through the cloud network 10 and may help at least a part of AI processing of the connected AI devices 100a to 100e.

In this case, the AI server 200 may train an artificial neural network according to a machine learning algorithm on behalf of the AI devices 100a to 100e, and directly store the learning model or transmit it to the AI devices 100a to 100e.

At this time, the AI server 200 receives input data from the AI devices 100a to 100e, infers a result value with respect to the input data received using the learning model, and provides a response or control command based on the inferred result value. It can be generated and transmitted to the AI devices 100a to 100e.

Alternatively, the AI devices 100a to 100e may infer a result value with respect to input data using a direct learning model, and generate a response or a control command based on the inferred result value.

Hereinafter, various embodiments of the AI devices 100a to 100e to which the above-described technology is applied will be described.

<AI+Robot>

The robot 100a may be implemented as a guide robot, a transport robot, a cleaning robot, a wearable robot, an entertainment robot, a pet robot, an unmanned flying robot, etc. to which AI technology is applied.

The robot 100a may include a robot control module for controlling an operation, and the robot control module may mean a software module or a chip implemented as hardware.

The robot 100a acquires state information of the robot 100a by using sensor information obtained from various types of sensors, detects (recognizes) surrounding environments and objects, generates map data, moves path and travels A plan may be determined, a response to a user interaction may be determined, or an action may be determined.

Here, the robot 100a may use sensor information obtained from at least one sensor among LiDAR, radar, and camera in order to determine a movement route and a travel plan.

The robot 100a may perform the above-described operations using a learning model composed of at least one artificial neural network. For example, the robot 100a may recognize a surrounding environment and an object using a learning model, and may determine an operation using the recognized surrounding environment information or object information. Here, the learning model may be directly learned from the robot 100a or learned from an external device such as the AI server 200.

In this case, the robot 100a may perform an operation by generating a result using the direct learning model, but transmits sensor information to an external device such as the AI server 200 and receives the result generated accordingly to perform the operation You may.

The robot 100a determines a movement path and travel plan using at least one of map data, object information detected from sensor information, or object information obtained from an external device, and controls the driving unit to apply the determined movement path and travel plan. Accordingly, the robot 100a may be driven.

The map data may include object identification information for various objects disposed in a space in which the robot 100a moves. For example, the map data may include object identification information for fixed objects such as walls and doors and movable objects such as flowerpots and desks. In addition, the object identification information may include a name, a type, a distance, a location, and the like.

In addition, the robot 100a may perform an operation or drive by controlling the driving unit based on the user's control/interaction. In this case, the robot 100a may acquire intention information of an interaction according to a user's motion or voice utterance, determine a response based on the acquired intention information, and perform the operation.

<AI+Autonomous Driving>

The autonomous driving vehicle 100b may be implemented as a mobile robot, a vehicle, an unmanned aerial vehicle, etc. by applying AI technology.

The autonomous driving vehicle 100b may include an autonomous driving control module for controlling an autonomous driving function, and the autonomous driving control module may mean a software module or a chip implemented as hardware. The autonomous driving control module may be included as a component of the autonomous driving vehicle 100b, or may be configured and connected to the outside of the autonomous driving vehicle 100b as separate hardware.

The autonomous driving vehicle 100b acquires state information of the autonomous driving vehicle 100b using sensor information obtained from various types of sensors, detects (recognizes) surrounding environments and objects, generates map data, A movement route and a driving plan may be determined, or an operation may be determined.

Here, the autonomous driving vehicle 100b may use sensor information obtained from at least one sensor among a lidar, a radar, and a camera, similarly to the robot 100a, in order to determine a moving route and a driving plan.

In particular, the autonomous vehicle 100b may receive sensor information from external devices to recognize an environment or object for an area where the field of view is obscured or an area over a certain distance, or receive information recognized directly from external devices.

The autonomous vehicle 100b may perform the above-described operations by using a learning model composed of at least one artificial neural network. For example, the autonomous driving vehicle 100b may recognize a surrounding environment and an object using a learning model, and may determine a driving route using the recognized surrounding environment information or object information. Here, the learning model may be directly learned from the autonomous vehicle 100b or learned from an external device such as the AI server 200.

In this case, the autonomous vehicle 100b may generate a result using a direct learning model and perform an operation, but it operates by transmitting sensor information to an external device such as the AI server 200 and receiving the result generated accordingly. can also be performed.

The autonomous vehicle 100b uses at least one of map data, object information detected from sensor information, or object information obtained from an external device to determine a movement path and a driving plan, and controls the driving unit to determine the movement path and driving The autonomous vehicle 100b may be driven according to a plan.

The map data may include object identification information for various objects disposed in a space (eg, a road) in which the autonomous vehicle 100b travels. For example, the map data may include object identification information for fixed objects such as street lights, rocks, and buildings, and movable objects such as vehicles and pedestrians. In addition, the object identification information may include a name, a type, a distance, a location, and the like.

Also, the autonomous vehicle 100b may perform an operation or drive by controlling the driving unit based on the user's control/interaction. In this case, the autonomous vehicle 100b may acquire intention information of an interaction according to a users motion or voice utterance, determine a response based on the obtained intention information, and perform the operation.

<AI+XR>

The XR apparatus 100c is AI technology applied, so a head-mount display (HMD), a head-up display (HUD) provided in a vehicle, a television, a mobile phone, a smart phone, a computer, a wearable device, a home appliance, and a digital signage, a vehicle, a stationary robot, or a mobile robot.

The XR device 100c analyzes three-dimensional point cloud data or image data obtained through various sensors or from an external device to generate position data and attribute data for three-dimensional points, thereby providing information on surrounding space or real objects. It can be obtained and output by rendering the XR object to be output. For example, the XR apparatus 100c may output an XR object including additional information on the recognized object to correspond to the recognized object.

The XR apparatus 100c may perform the above-described operations using a learning model composed of at least one artificial neural network. For example, the XR apparatus 100c may recognize a real object from 3D point cloud data or image data using a learning model, and may provide information corresponding to the recognized real object. Here, the learning model may be directly learned from the XR device 100c or learned from an external device such as the AI server 200.

In this case, the XR device 100c may perform an operation by generating a result using the direct learning model, but it transmits sensor information to an external device such as the AI server 200 and receives the result generated accordingly to perform the operation. can also be done <AI+Robot+Autonomous Driving>

The robot 100a may be implemented as a guide robot, a transport robot, a cleaning robot, a wearable robot, an entertainment robot, a pet robot, an unmanned flying robot, etc. to which AI technology and autonomous driving technology are applied.

The robot 100a to which AI technology and autonomous driving technology are applied may mean a robot having an autonomous driving function or a robot 100a that interacts with the autonomous driving vehicle 100b.

The robot 100a having an autonomous driving function may collectively refer to devices that move by themselves according to a given movement line without user's control or by determining a movement line by themselves.

The robot 100a with the autonomous driving function and the autonomous driving vehicle 100b may use a common sensing method to determine one or more of a moving route or a driving plan. For example, the robot 100a having an autonomous driving function and the autonomous driving vehicle 100b may determine one or more of a movement route or a driving plan by using information sensed through lidar, radar, and camera.

The robot 100a interacting with the autonomous driving vehicle 100b exists separately from the autonomous driving vehicle 100b and is linked to an autonomous driving function inside or outside the autonomous driving vehicle 100b, or the autonomous driving vehicle 100b) can perform an operation associated with the user on board.

At this time, the robot 100a interacting with the autonomous driving vehicle 100b acquires sensor information on behalf of the autonomous driving vehicle 100b and provides it to the autonomous driving vehicle 100b, or obtains sensor information and obtains information about the surrounding environment or By generating object information and providing it to the autonomous driving vehicle 100b, the autonomous driving function of the autonomous driving vehicle 100b may be controlled or supported.

Alternatively, the robot 100a interacting with the autonomous driving vehicle 100b may monitor a user riding in the autonomous driving vehicle 100b or control a function of the autonomous driving vehicle 100b through interaction with the user. For example, when it is determined that the driver is in a drowsy state, the robot 100a may activate an autonomous driving function of the autonomous driving vehicle 100b or assist in controlling a driving unit of the autonomous driving vehicle 100b. Here, the function of the autonomous driving vehicle 100b controlled by the robot 100a may include not only an autonomous driving function, but also a function provided by a navigation system or an audio system provided in the autonomous driving vehicle 100*b*.

Alternatively, the robot 100*a* interacting with the autonomous driving vehicle 100*b* may provide information or assist a function to the autonomous driving vehicle 100*b* from the outside of the autonomous driving vehicle 100*b*. For example, the robot 100*a* may provide traffic information including signal information to the autonomous driving vehicle 100*b*, such as a smart traffic light, or interact with the autonomous driving vehicle 100*b*, such as an automatic electric charger for an electric vehicle. You can also automatically connect an electric charger to the charging port.

<AI+Robot+XR>

The robot 100*a* may be implemented as a guide robot, a transport robot, a cleaning robot, a wearable robot, an entertainment robot, a pet robot, an unmanned flying robot, a drone, etc. to which AI technology and XR technology are applied.

The robot 100*a* to which the XR technology is applied may mean a robot that is a target of control/interaction within an XR image. In this case, the robot 100*a* is distinguished from the XR device 100*c* and may be interlocked with each other.

When the robot 100*a*, which is the target of control/interaction within the XR image, obtains sensor information from sensors including a camera, the robot 100*a* or the XR device 100*c* generates an XR image based on the sensor information. and the XR apparatus 100*c* may output the generated XR image. In addition, the robot 100*a* may operate based on a control signal input through the XR device 100*c* or a user's interaction.

For example, the user can check the XR image corresponding to the viewpoint of the remotely linked robot 100*a* through an external device such as the XR device 100*c*, and adjust the autonomous driving path of the robot 100*a* through interaction or, control motion or driving, or check information of surrounding objects.

<AI+Autonomous Driving+XR>

The autonomous vehicle 100*b* may be implemented as a mobile robot, a vehicle, an unmanned aerial vehicle, etc. by applying AI technology and XR technology.

The autonomous driving vehicle 100*b* to which the XR technology is applied may mean an autonomous driving vehicle equipped with a means for providing an XR image or an autonomous driving vehicle subject to control/interaction within the XR image. In particular, the autonomous driving vehicle 100*b*, which is the target of control/interaction within the XR image, is distinguished from the XR device 100*c* and may be interlocked with each other.

The autonomous vehicle 100*b* provided with means for providing an XR image may obtain sensor information from sensors including a camera, and may output an XR image generated based on the acquired sensor information. For example, the autonomous vehicle 100*b* may provide a real object or an XR object corresponding to an object in a screen to the occupant by outputting an XR image with a HUD.

In this case, when the XR object is output to the HUD, at least a portion of the XR object may be output so as to overlap the real object to which the passenger's gaze is directed. On the other hand, when the XR object is output to a display provided inside the autonomous vehicle 100*b*, at least a portion of the XR object may be output to overlap the object in the screen. For example, the autonomous vehicle 100*b* may output XR objects corresponding to objects such as a lane, other vehicles, traffic lights, traffic signs, two-wheeled vehicles, pedestrians, and buildings.

When the autonomous driving vehicle 100*b*, which is the target of control/interaction within the XR image, acquires sensor information from sensors including a camera, the autonomous driving vehicle 100*b* or the XR device 100*c* performs An XR image is generated, and the XR apparatus 100*c* may output the generated XR image. In addition, the autonomous vehicle 100*b* may operate based on a control signal input through an external device such as the XR device 100*c* or a user's interaction.

In the above, preferred embodiments have been exemplarily described, but the disclosure of the present specification is not limited to such specific embodiments, and thus, various modifications, changes, or can be improved.

What is claimed is:

1. A method of performing wireless communication by a user equipment (UE) comprising:
    registering with a second Public Land Mobile Network (PLMN) and receiving a disaster roaming service from the second PLMN, based on a first PLMN being in a disaster condition;
    receiving, from the second PLMN, an indication based on the disaster condition in the first PLMN being over;
    performing a deregistration procedure with the second PLMN, based on the indication;
    selecting the first PLMN; and
    performing a registration procedure with the first PLMN.

2. The method of claim 1, wherein the indication includes information to cancel the connection with the second PLMN and to access the first PLMN and to perform a registration procedure with the first PLMN.

3. The method of claim 1, wherein the indication includes information that an emergency state of the first PLMN ended.

4. The method of claim 1, wherein the deregistration procedure comprises:
    transmitting a deregistration request message to an Access and Mobility Management Function (AMF) of the second PLMN through the base station of the second PLMN; and
    receiving a deregistration accept message from the AMF of the second PLMN through the base station of the second PLMN.

5. The method of claim 1, wherein the registration procedure comprises:
    transmitting a registration request message to AMF of the first PLMN through a base station of the first PLMN;
    receiving a registration accept message from the AMF of the first PLMN through the base station of the first PLMN.

6. The method of claim 1,
    wherein the indication includes information on an end time of service by the second PLMN,
    wherein the UE does not request service from the second PLMN, after the end time elapse.

7. The method of claim 1, wherein the indication is received through an SIB (System Information Block).

8. The method of claim 1, further comprising:
    transmitting a request message to maintain connection to specific application server, before the deregistration procedure; and
    receiving a resumption request message from the specific application server, after the registration procedure.

9. A method for a second Public Land Mobile Network (PLMN) comprising:
    performing a registration with a User Equipment (UE) for disaster roaming, based on a first PLMN being in a disaster condition;

providing a disaster roaming service to the UE;
determining that the disaster condition in the first PLMN is over;
transmitting, to the UE, an indication, based on the disaster condition in the first PLMN being over;
performing a deregistration procedure with the second PLMN UE, based on the disaster condition in the first PLMN being over.

10. The method of claim 9, wherein the indication includes information to cancel the connection with the second PLMN and to access the first PLMN and to perform a registration procedure with the first PLMN.

11. The method of claim 9, wherein the indication includes information that an emergency state of the first PLMN ended.

12. The method of claim 9, wherein the deregistration procedure comprises:
receiving a deregistration request message from the UE; and
transmitting a deregistration accept message to the UE.

13. The method of claim 9,
wherein the indication includes information on an end time of service by the second PLMN,
wherein the second PLMN does not provide service to the UE, after the end time.

14. The method of claim 9, wherein the first message is received through an SIB (System Information Block).

15. The method of claim 9, further comprising:
transmitting a request message to maintain connection to a specific application server, before the deregistration procedure.

16. A device performing wireless communication, comprising:
at least one transceiver;
at least one processor;
wherein the at least one processor is configured to perform operations, comprising:
registering with a second Public Land Mobile Network (PLMN) and receiving a disaster roaming service from the second PLMN, based on a first PLMN being in a disaster condition;
receiving, from the second PLMN, an indication based on the disaster condition in the first PLMN being over;
performing a deregistration procedure with the second PLMN, based on the indication;
selecting the first PLMN; and
performing a registration procedure with the first PLMN.

17. The device of claim 16, wherein the indication includes information to cancel the connection with the second PLMN and to access the first PLMN and to perform a registration procedure with the first PLMN.

18. The device of claim 16, wherein the indication includes information that an emergency state of the first PLMN ended.

19. The device of claim 16, wherein the deregistration procedure comprises:
transmitting a deregistration request message, by the processor, to an Access and Mobility Management Function (AMF) of the second PLMN through the base station of the second PLMN; and
receiving a deregistration accept message, by the processor, from the AMF of the second PLMN through the base station of the second PLMN.

20. The device of claim 16, wherein the registration procedure comprises:
transmitting a registration request message, by the processor, to an AMF of the first PLMN through a base station of the first PLMN;
receiving a registration accept message, by the processor, from the AMF of the first PLMN through the base station of the first PLMN.

* * * * *